United States Patent [19]

Dadpey et al.

[11] Patent Number: 5,057,760
[45] Date of Patent: Oct. 15, 1991

[54] TORQUE DETERMINATION FOR CONTROL OF AN INDUCTION MOTOR APPARATUS

[75] Inventors: Habib Dadpey, Atlanta, Ga.; David J. Shero, South Park Township, Allegheny County; Lalan G. Miller, Forest Hills, both of Pa.

[73] Assignee: AEG Westinghouse Transportation Systems, Inc., Pittsburgh, Pa.

[21] Appl. No.: 926,825

[22] Filed: Nov. 3, 1986

Related U.S. Application Data

[63] Continuation of Ser. No. 696,832, Jan. 31, 1985, abandoned.

[51] Int. Cl.⁵ .............................................. H02P 5/40
[52] U.S. Cl. .................................................. 318/807
[58] Field of Search ......... 318/803, 805, 798, 802-812

[56] References Cited

U.S. PATENT DOCUMENTS

| | | | |
|---|---|---|---|
| 4,091,294 | 5/1978 | Zankl et al. | 318/808 |
| 4,158,163 | 7/1979 | Eriksen | 318/798 |
| 4,207,510 | 6/1980 | Woodbury | 318/802 |
| 4,316,132 | 2/1982 | Geppert | 318/802 |
| 4,392,100 | 7/1983 | Stanton et al. | 318/803 |
| 4,450,398 | 5/1984 | Bose | 318/803 |

OTHER PUBLICATIONS

Andreas, J. C., *Energy-Efficient Electric Motors*, Decker Inc., 1982, pp. 48–53.

Bose et al, "A High-Performance Pulsewidth Modulator for an Inverter-Fed Drive System Using a Microcomputer", IEEE Transactions on Industry Applications, vol. IA-19, No. 2, Mar./Apr. 1983, pp. 235–243.

*Primary Examiner*—David Smith, Jr.
*Attorney, Agent, or Firm*—Spencer & Frank

[57] ABSTRACT

An AC induction motor control apparatus includes the determination of the motor torque by one of the use of a torque versus dc input power lookup table for each of selected motor speeds below a predetermined speed and by a mathematical calculation of a plurality of power losses in relation to the dc input power and the inverter frequency for motor speeds above that selected speed.

8 Claims, 10 Drawing Sheets

TORQUE DETERMINATION FOR CONTROL OF AN INDUCTION MOTOR APPARATUS

This application is a continuation of application Ser. No. 06/696,832 filed Jan. 31, 1985 now abandoned.

CROSS REFERENCE TO RELATED APPLICATION

The present application is related to the following patent applications Ser. No. 06/696,814, filed Jan. 31st, 1985, which issued on June 16th, 1987 as U.S. Pat. No. 4,673,859 by D. J. Shero et al. and entitled "Induction Motor Synthesis Control Apparatus And Method", Ser. No. 06,696,938, filed Jan. 31st, 1985, now abandoned; Ser. No. 06/946,159, filed Dec. 22nd, 1986 as a continuation of Ser. NO. 06/696,938 and which issued on Sept. 29th, 1987 as U.S. Pat. No. 4,697,130 by H. Dadpey et al. and entitled "Induction Motor Regenerative Brake Control Apparatus And Method", and Ser. No. 06,696,833, filed Jan. 31st, 1985, now abandoned; Ser. No. 06/936,928, filed on Nov. 28th, 1986 as a continuation of Ser. No. 06/696,833, and which issued on July 22nd, 1988 as U.S. Pat. No. 4,777,420 by D. J. Shero et al. and entitled "Induction Motor Control Apparatus and Method", and a patent application Ser. No. 617,448, filed June 5, 1984 by C. W. Edwards and entitled PWM Motor Drive With Torque Determination, which are assigned to the same assignee and the disclosures of which are incorporated herein by reference.

BACKGROUND OF THE INVENTION

1. Field of the Invention:

This invention relates in general to the determination of output torque delivered by an induction motor drive driven from a dc power source with an inverter.

2. Description of the Prior Art:

It is known that the input power to an induction motor drive apparatus, that is supplied power from a dc source is in accordance with the relationship $$\text{Power in} = \text{voltage dc} * \text{current dc} \quad (1)$$

where the voltage dc and current dc can be readily measured.

The output power of the motor is the input power minus all power losses in the motor drive system and the output torque of the motor is $$\text{Torque out} = \frac{P_{IN} - \text{Power Losses}}{\text{Inverter Frequency}} \quad \text{(not including rotor losses)} \quad (2)$$

An output torque sensor can be coupled with a motor shaft to measure the output torque and this permits an empirical determination of the motor drive apparatus power losses, when the input power is known and using above equation 2.

For many applications of the motor, it might not be desired to couple a torque sensor with the motor shaft to measure the output torque.

It is known to sense the ac voltage and AC current of the motor. For a three phase induction motor this has required sensing all three phase voltages and all three phase currents, or sensing two of the phase voltages and two of the phase currents and deriving the third phase voltage and current in relation to the sensed parameters. This can present a problem in relation to the variable frequency operation of the motor.

SUMMARY OF THE INVENTION

The present invention provides an output torque determination for an ac motor drive apparatus using already known input dc voltage and input dc current parameters, and either determining the motor output torque in relation to predetermined lookup tables of torque versus speed or by determining the motor power losses through operation of a mathematical model of the motor apparatus as selected in accordance with the operational speed of the motor, without the actual sensing of the actual output torque, the motor ac voltage or the motor ac current parameters.

DESCRIPTION OF THE PREFERRED EMBODIMENT

Figure 1:
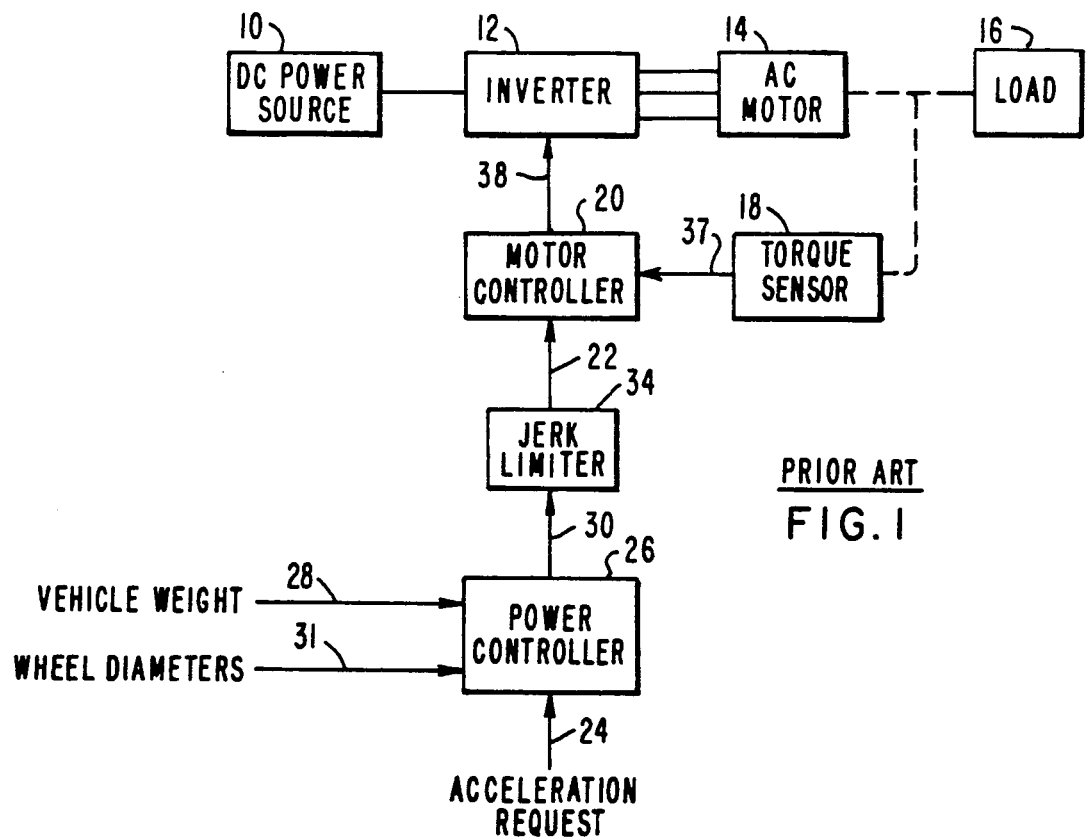
FIG. 1 shows a prior art dc power supply operating through an inverter to energize a three phase ac motor.

In FIG. 1 there is shown a prior art torque control apparatus for a three phase ac motor, and including a dc power source 10 energizing an inverter 12 for providing three phase energization of the ac motor 14 coupled with a load 16 which could be a transit vehicle. A torque sensor 18 is connected with the output shaft of the ac motor 14 for sensing the output torque 37 delivered to the load 16. A power controller 26 (also referred to as the car control) receives as inputs an acceleration request 24 from the transit vehicle operator, the transit vehicle weight 28, and the transit vehicle wheel diameters 31. The power controller 26 produces a torque effort request 30 which represents the torque to be achieved by the ac motor 14 in order to accelerate the transit vehicle, load 16, at the rate defined by acceleration request 24. A jerk limiter 24 takes the torque effort request 30 and jerk limits it to provide a jerk limited torque effort request 22 to the motor controller 20. The motor controller 20 produces GTO firing pulses 38 for the inverter 12, in order to match the torque feedback 37 to the jerk limited torque effort request 22.

Figure 2:
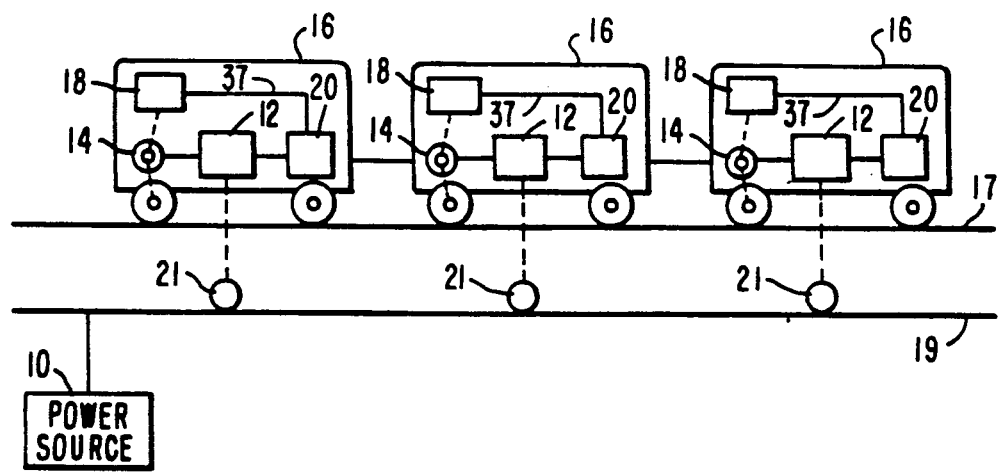
FIG. 2 shows a prior art transit vehicle operative with a propulsion motor to determine the movement of that vehicle along a roadway track.

In FIG. 2 there is shown a plurality of transit vehicles 16 operative with a roadway track 17. The power source 10 is coupled through a third rail 19 and a power pickup member 21 to the inverter 12 carried by each vehicle 16. The motor 14 is connected with the drive wheels to propel the vehicle 16 along the track 17. The torque sensor 18 is coupled with the motor 14 for providing a torque feedback signal 37 to the motor controller 20.

Figure 3:
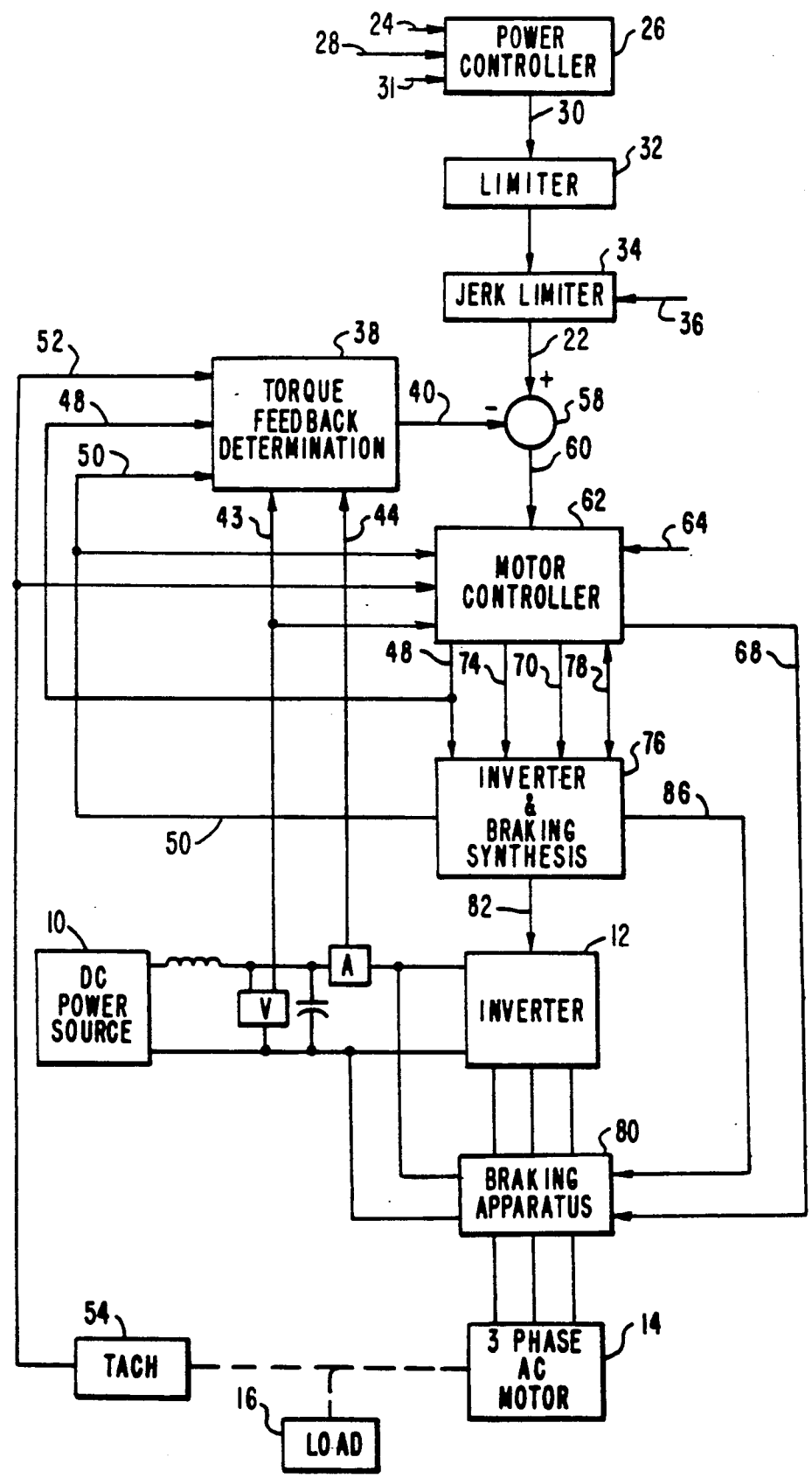
FIG. 3 shows schematically the torque feedback determination apparatus of the present invention for controlling a three phase ac induction motor.

In FIG. 3 there is shown a suitable motor control apparatus for operation with the present invention to control a three phase ac motor, such as the propulsion motor of a mass transit passenger vehicle. The vehicle operator can provide a power controller 26 with a vehicle acceleration request which, by taking into account the vehicle weight and vehicle wheel diameters, the power controller 26 translates into a torque effort request signal 30 which is input to a signal limiter 32 for preventing unreasonable torque effort requests. A jerk limiter 34 is provided in relation to a desired jerk rate 36 for establishing a jerk limited torque request 22 for the comfort of the vehicle passengers. A torque feedback determination apparatus 38 determines the torque feedback 40 by measuring the system input power in relation to the dc voltage 43 and dc current 44 provided by a power supply 10 and in relation to the inverter frequency 48 and the synthesis mode 50 and the tachometer speed 52 provided by a tachometer 54 coupled with the propulsion motor 14 to estimate the output torque of the motor 14 The torque feedback signal 40 is supplied to the negative input of a summing junction 58 for comparison with the jerk limited torque request signal 22 supplied to the positive input of the summing junction 58. The resulting torque error signal 60 is supplied to a motor controller 62. A car control enable signal 64 from the operator permits the propulsion motor 14 to run or not. Other needed inputs by the motor controller 62 consist of the dc line voltage 43 and the synthesis mode 50 of the inverter. The motor controller 62 outputs the braking thyristors enable 68, the requested braking angle 70, the requested inverter frequency 48, and the requested inverter voltage percent 74 to the inverter and braking synthesis apparatus 76, which in addition has as an input and output the control state signal 78 and provides the synthesis mode signal 50 to the motor controller 62 and to the torque feedback determination apparatus 38. When the motor 14 is in brake operation with additional voltage supplied by the transformer braking circuit 80, the control state signal 78 operates to keep the synthesis mode in six-step and prevent a change to quasi six-step or PWM modes. The inverter and braking synthesis apparatus 76 outputs the inverter GTO firing pulses 82 to the inverter 12 and the brake GTO firing pulses 86 to the braking circuit 80. The inverter 12 drives the motor 14 in power and in brake operation and the braking circuit 80 operates with the motor 14 when additional braking torque is desired above base speed operation.

In FIGS. 4A, 4B, 4C, and 4D there is shown a program flow chart for determining the torque feedback in relation to the deliverable power of the motor 14 and as a function of the motor speed. If the tachometer frequency 52 is less than 12 Hz, then a lookup table is employed for an empirical determination of the motor torque. Above a tachometer frequency of 14.5 Hz, the motor torque is determined as a function of a plurality of calculated power losses including stator losses, friction and windage and similar losses, where the input power minus the sum of these losses when divided by inverter frequency as shown by above equation (2) establishes the output torque of the motor. The rotor current losses are not included. Between 12 Hz and 14.5 Hz, the same method is repeated as the last time torque was calculated in order to provide a band of hysteresis for control stability.

Figure 4A:
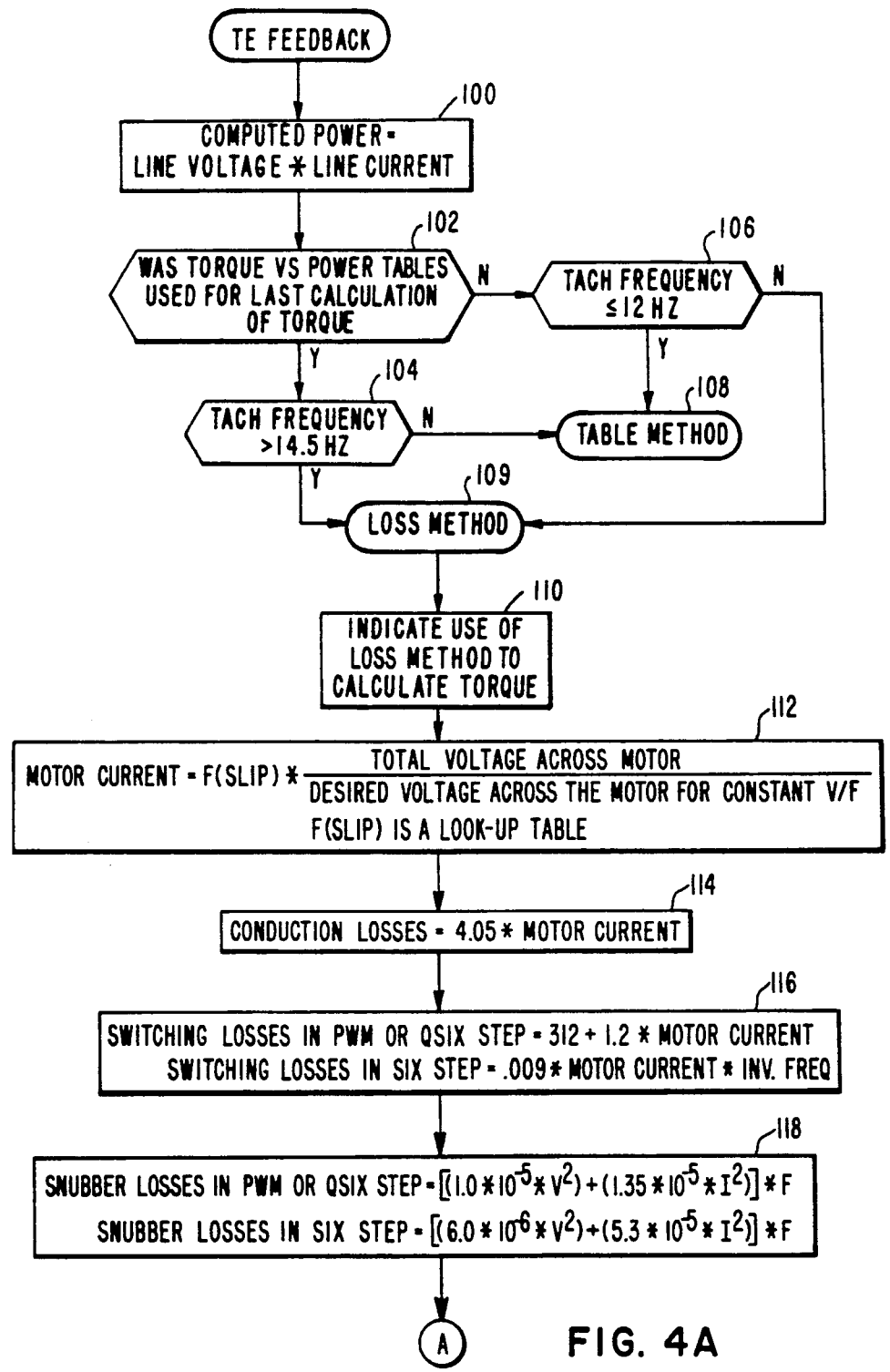
FIGS. 4A, 4B, 4C and 4D show a program flow chart for determining the torque feedback provided in FIG. 3 using a mathematical model of the motor drive apparatus.

In relation to FIG. 4A at block 100, the input power is computed as the dc line voltage times the dc line current, and the input power is plus or minus depending upon whether the motor 14 is regenerating in brake or is drawing current from the line in power. At block 102 a decision is made to see whether the torque in relation to speed tables were last used for the calculation of the torque. These torque lookup tables, which have been digitized and are empirically established as a function of input power for selected increments of speed are stored in the computer memory for the below 14.5 Hz low speed range of operation, since for such low speed operation the torque versus input power is not linear. The power loss calculation model is satisfactory for motor operation above 12 Hz. For this reason block 102 checks to see if the program is already using the lookup table method, and if the answer is yes, at block 104 a check is made to see if the tach frequency 52 is greater than 14.5 Hz. If the answer is no at block 102 then at block 106 a check is made to see if the tach frequency 52 is less than or equal to 12 Hz. If the answer is no at block 104 or if the answer is yes at block 106, then the lookup table method routine is branched to at block 108. If the answer is yes at block 104 or if the answer is no at block 106, then the power loss calculation method at block 109 is started at block 110 where a flag is set indicating that the power loss calculation method is being used, so the next time through the program, the appropriate path is taken to check if the table method should be used or not. At block 112 in order to calculate the power losses in the system, RMS motor current is needed, and motor current is determined as a function of the slip times the ratio of the voltage across the motor over the desired voltage across the motor for constant volts per hertz ratio operation. A typical example of a constant volts per hertz ratio for a propulsion motor is 9.33. For example, at 100 Hz and a voltage to frequency ratio of 9.33, the motor would require about 933 volts line-to-line for this operation. For a 600 volt dc power supply which can only supply about 468 volts line-to-line to the motor, the ratio of these two voltages is a multiplying factor to determine the motor current. The function of slip is provided by a predetermined lookup table in this regard, which lookup table can be established by a well known motor model in relation to a sine wave voltage applied to the motor, and for a given slip of the motor a particular motor current is provided with the assumption that a particular motor temperature remains constant. At block 114 the conduction losses in the inverter switching devices are calculated, where the same equation is used regardless of the synthesis switching mode. The conduction losses are established as $$\text{conduction losses} = 4.05 * \text{motor current} \quad (3)$$

At block 116 the switching losses are calculated, with a first equation determining switching losses in PWM or quasi six-step where the average switching frequency is 400 Hz and the switching losses for a 400 Hz carrier frequency would be $$\text{switching losses} = 312 + 1.2 * \text{motor current} \quad (4)$$

The switching losses in six-step are lower because the average switching frequency is not 400 Hz but rather the switching losses are determined in accordance with the relationship $$\text{switching losses in six-step} = 0.009 * \text{motor current} * \text{inverter frequency} \quad (5)$$

At block 118 the snubber losses are determined, which are the losses in the snubbers across the GTO switch devices and are the resistive and capacitive losses in charging and discharging the snubber circuits. In PWM or quasi six-step the snubber losses are determined as $$\text{snubber losses} = [1.0*10^{-5}*V^2) + (1.35*10^{-5}I^2)]*F \quad (6)$$

where V is the dc line voltage, I is the motor current, and F is the switching frequency of which an average value of 400 Hz is used for PWM and quasi six-step. For six-step operation, the snubber losses are $$\text{snubber losses} = [(6.0*10^{-6}*V^2) - (5.3*10^{-5}*I^2)]*F \quad (7)$$

At block 120, the inverter losses are determined as the sum of the conduction losses, the switching losses and the snubber losses.

Figure 4B:
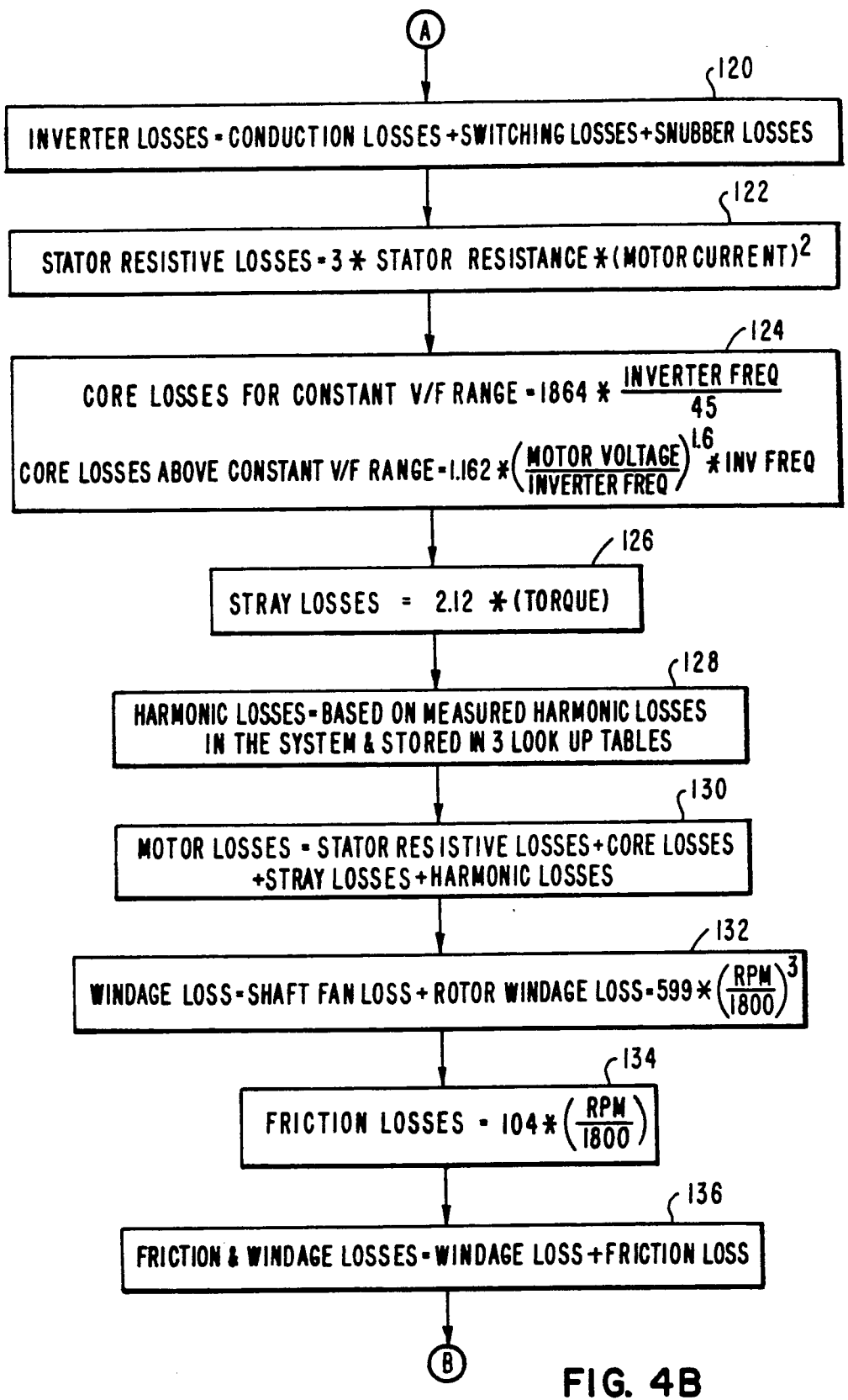

Now it is necessary as shown in FIG. 4B to calculate the motor losses and beginning at block 122 the stator resistive losses are determined as $$\text{stator resistive losses} = 3 \times (\text{the stator resistance}) \times (\text{motor current}^2) \quad (8)$$

which is a straight forward I²R loss for three stator windings. At block 124 the core losses are determined for the constant volts over frequency range, where the desired motor voltage is still available and for the example of a motor 14 having a base speed of 45 Hz and a 9.33 volts per hertz constant which determines the parameter in the first core loss equation, using the equation $$\text{core losses} = 1864 \times \frac{\text{inverter frequency}}{45} \quad (9)$$

A second equation is used for the six-step mode of operation above the constant volts over frequency range where the desired voltage is not available, $$\text{core losses} = 1.162 \frac{\text{motor voltage}}{\text{inverter frequency}} 1.6 * \text{inverter frequency} \quad (10)$$

For the particular motor being controlled the stray losses in block 126 uses a state of the art equation well known by people who design motors which is $$\text{stray losses} = 2.12 * \text{motor torque} \quad (11)$$

where torque is the previous torque.

At block 128 the harmonic losses are determined using a series of lookup tables and equations. It is extremely difficult to create a loss model for harmonic losses that is precise. Therefore, an abbreviated approach is taken with the harmonic losses to arrive at an approximate value. To form the lookup tables and equations to be used by the microprocessor to calculate harmonic losses, the ac motor is run at several operating speeds and loads in a laboratory environment. At each operating point inverter input power, output motor torque and RMS motor current are measured. From this data, all defined losses, except harmonic losses, are calculated using their respective equations. The motor output power is derived by multiplying the output torque times the inverter frequency. This output power is subtracted from the input power to arrive at the remaining losses. These remaining losses should approximate the harmonic losses providing that the derived loss equations are reasonably accurate. The estimated harmonic losses at all operating points are then correlated to arrive at a combination of lookup tables and equations that the microprocessor can use to calculate harmonic losses.

For the particular ac motor drive system used, correlation of the harmonic loss data yielded a lookup table for each waveform synthesis technique. Each of these lookup tables relates harmonic losses at no load to an operating parameter. For PWM synthesis operation, the lookup table relates losses as a function of inverter frequency. For quasi six-step synthesis, losses are represented as a function of requested voltage percent. For six-step synthesis, losses are represented as a function of inverter frequency. If the motor is providing torque, the laboratory data revealed that the harmonic losses increased in magnitude. The following equation was found to approximate the harmonic losses over the full motor load range:

$$\text{harmonic losses} = 1 + \frac{\text{slip frequency}}{\text{rated slip frequency}} * 1.2 * \text{lookup table value} \quad (11A)$$

At block 128 the synthesis mode is checked. Depending on the mode, one of three lookup tables is accessed to obtain the harmonic losses the motor would experience under similar operating conditions but at no load. This lookup table value along with the slip frequency and the rated slip frequency are used in equation 11A to determine the harmonic losses in the ac motor.

At block 130 the motor losses are determined as the sum of the stator losses, the core losses, the stray losses and the harmonic losses.

At block 132 the windage loss has two components, the shaft fan loss and the rotor windage loss, and a well known equation is used with a four pole motor for determining these losses which is $$\text{windage loss} = 599 \times \frac{\text{RPM}^3}{1800} \quad (12)$$

where 1800 is the base frequency of the motor such that at base frequency the windage loss is 599 watts. At block 134 the friction losses of the rotor and fan for the motor 14 are determined again as a ratio of $$\text{friction losses} = \frac{104 \times \text{RPM}}{1800} \quad (13)$$

where 104 watts is known to be the loss due to friction at the base speed of 1800 RPM and a linear ratio above and below base speed is provided. At block 136 the total of the friction and windage losses is determined as the sum of the losses established in blocks 132 and 134.

At block 138 a check is made to see if the transformer within the braking circuit 80 is not shorted, which would be the case when the motor 14 is operating with transformer braking in the six-step mode. When the motor is operating without transformer braking, at block 140 the braking losses are established for the thyristors braking losses=4.05*motor current                                    (14)

Figure 4C:
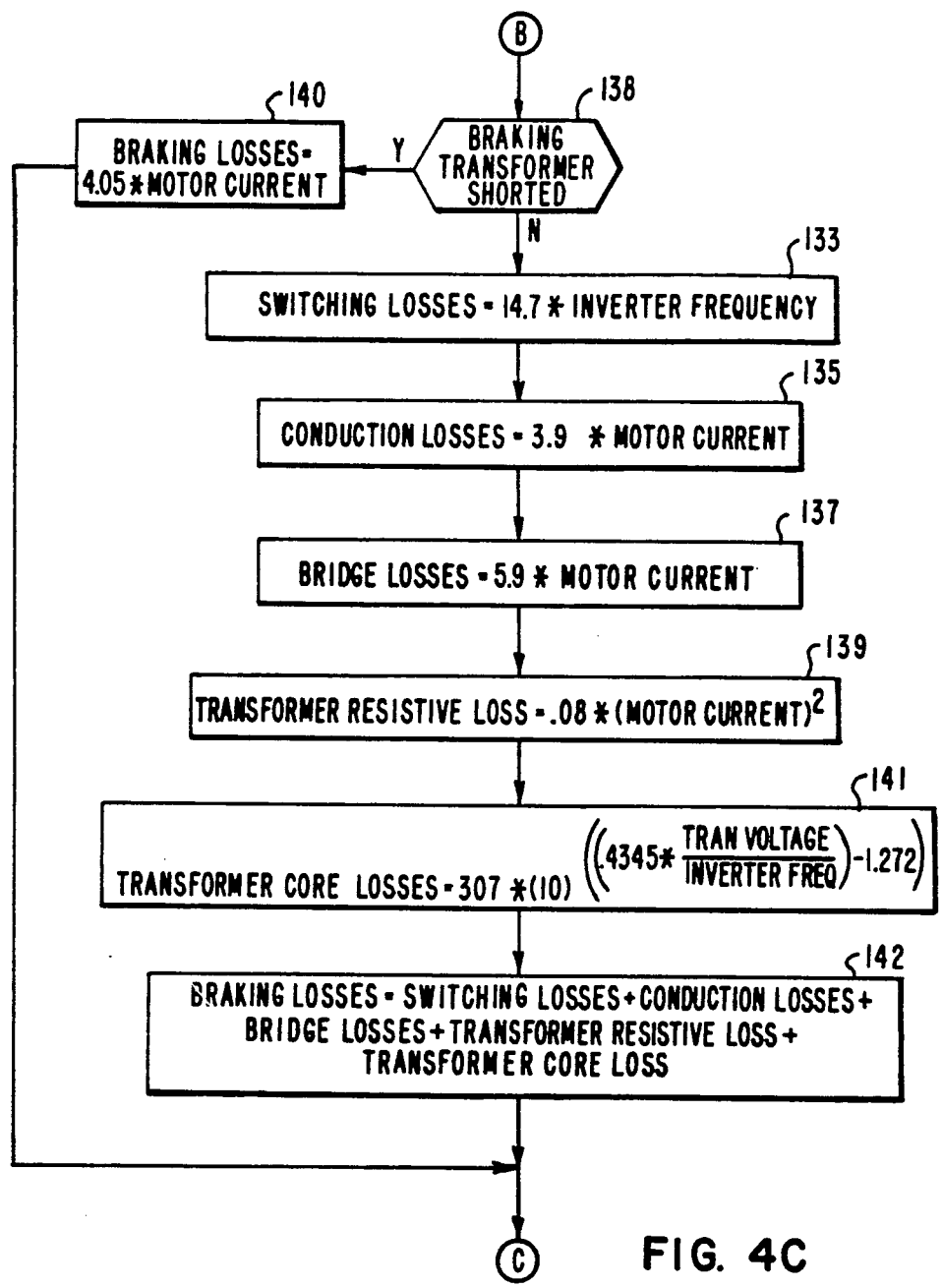
Figure 4D:
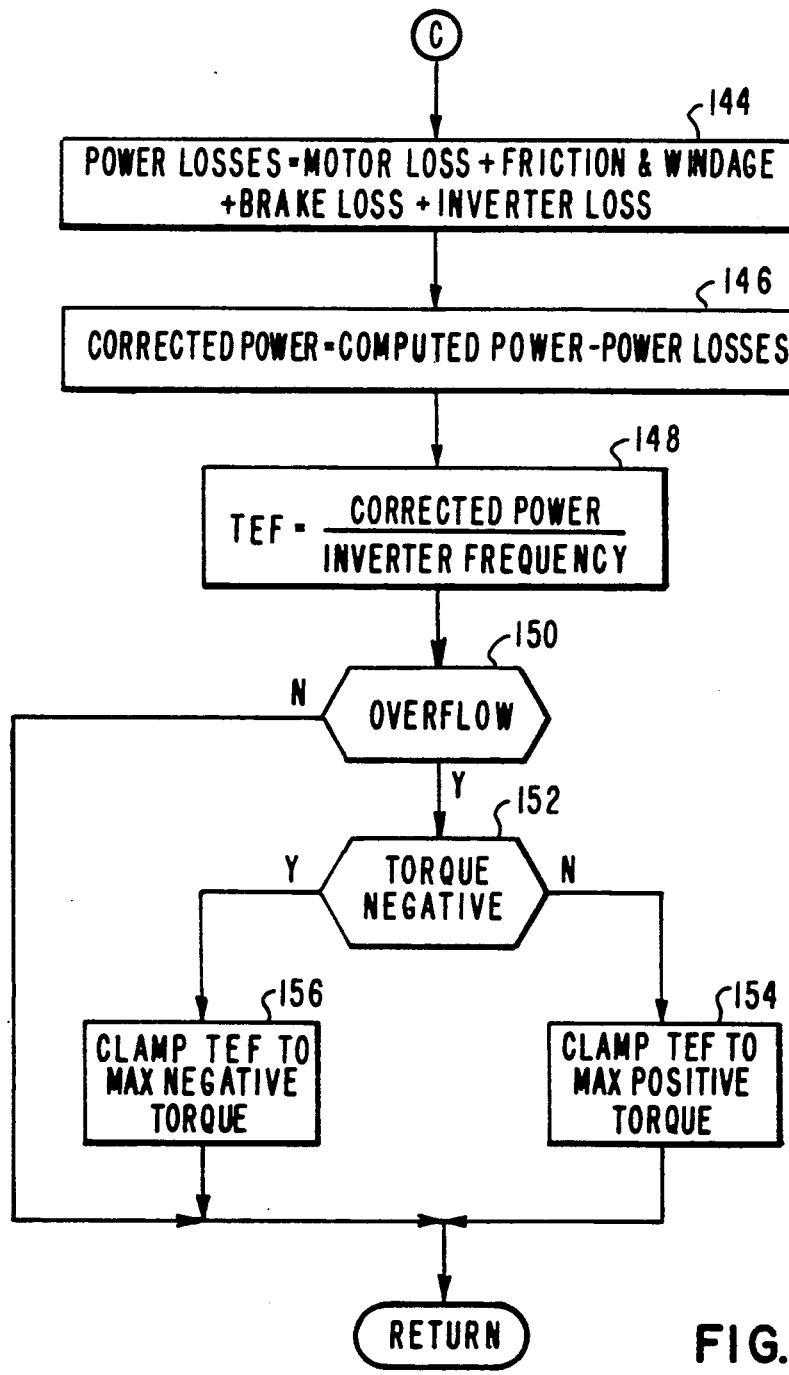

If the transformer braking is provided, then at block 142 the transformer braking losses are determined as the sum of the snubber and GTO switching losses plus the GTO and line diode conduction losses plus the diode bridge losses plus the transformer resistive loss plus the transformer core loss, where these respective losses are determined as set forth in FIG. 4C in respective blocks 133, 135, 137, 139 and 141 for the equation relationship used to determine each of those losses. At block 144 the power losses are determined as the motor loss established at block 130 plus the friction and windage loss established at block 136 plus the brake loss established at block 140 or 142 plus the inverter loss established at block 120. In block 146 the corrected power, which is the deliverable power, is determined as the input power, which is the computed power of block 100, minus the computed power losses of block 144. At block 148 the torque feedback TEF is set equal to the corrected power divided by the inverter frequency, which is the deliverable power divided by the stator frequency for the motor 14 and this is the torque feedback 37 shown in FIG. 3. In block 150 since a division operation was provided in block 148 that could result in an overflow condition when the inverter frequency is small, the block 150 determines that there was not an overflow. If the register did overflow, the result is erroneous because only the lower portion of the result is in the register and the most significant information is lost, so if there was an overflow, at block 152 a check is made to see if the torque was positive or negative. If negative torque is present, the motor is in the brake mode and for a positive torque the motor is delivering power in the power mode. If the torque is positive, at block 154 it is clamped to maximum positive torque. In block 156 if the torque is negative, it is clamped to maximum negative torque to protect against inaccuracies in the computation of a finite number of bits, and a return is made.

Figure 5A:
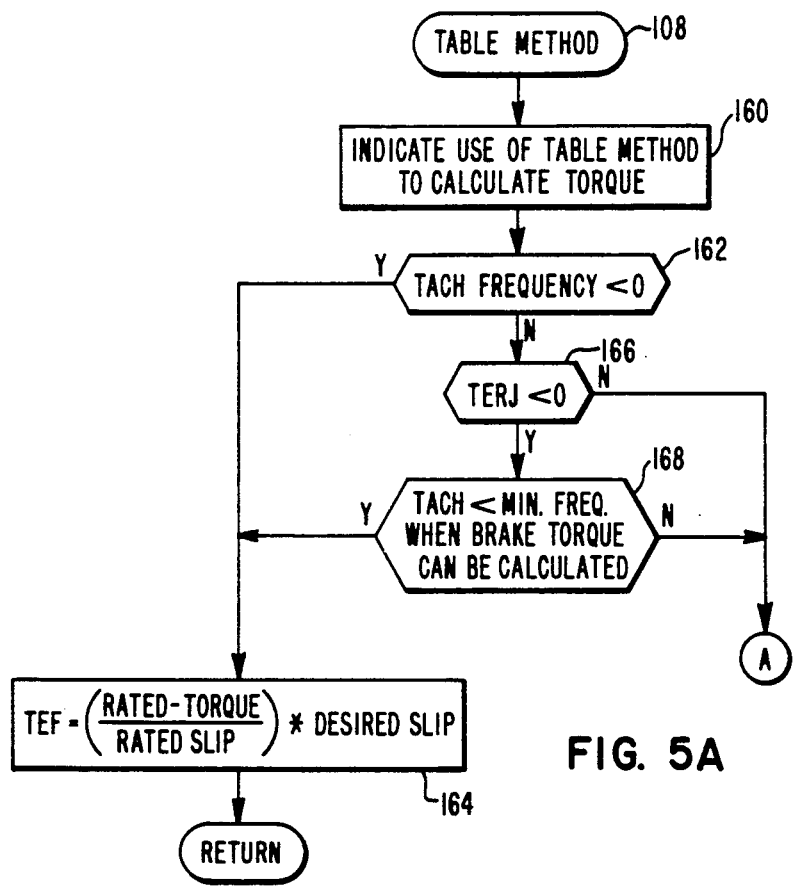
FIGS. 5A, 5B and 5C show a program flow chart for establishing the determined torque feedback using torque versus speed memory lookup tables.

The program shown in FIG. 5A named Table Method is called at block 108 of the program shown in FIG. 4A. At block 160 a flag is set to indicate that the operation is using the lookup torque tables. Block 162 provides a check to see if the tach frequency 52 is less than zero to determine if the operation is going negative, and if so several operations are bypassed. The tach frequency 52 may be less than zero when the vehicle is in a rollback operation during a start of forward movement and upon the friction brakes being released, so at this time open loop power is applied to get the vehicle moving forward. If the tach frequency 52 is negative, the program goes to block 164 where an open loop calculation of torque is made in relation to the desired slip. If the tachometer frequency is greater than zero at block 162, then at block 166 a check is made to see if the jerk limited torque request 22 is less than zero which would be present for a braking mode of operation, and if so at block 168 a check is made to see if the tachometer frequency 52 is less than a minimum frequency where the brake torque can be calculated and the Table Method is valid. For a transportation vehicle at very low tachometer frequencies it is desired to apply the friction brake.

If the tachometer frequency is above the minimum frequency at block 168 where calculations are proper, the program goes to block 170 where a parameter A is set equal to tach frequency, with one bit being 1/64 Hz. At block 172, a parameter B is set equal to the integer portion of A, which is determined by dividing A by 64, such that anything between 0 to 63 would result in a zero integer value, anything between 64 and 127 would result in a one integer value and so forth. In block 174, a parameter C is set equal to the offset from the starting location of the very first table to the starting location of the table corresponding to the integer tach frequency. Since the tables have 32 entries each, in block 174, by multiplying the B integer value by 32, the desired table is selected in this manner. If the integer value is zero this is the first table, if the integer value is one multiplying it by 32 would give the address 32 which is the start address of the second table, and so forth. In block 176 a parameter D is determined by adding the start address of the very first table to the parameter C which is the offset from that table. Parameter C is the start address of the table if the very first table is started at location zero, but since the first table may start someplace else, by adding the offset to the start address of the first table, the pointer D is provided to point to the start address of the table that is desired. At block 178 the Calculate Table Torque Routine is called, which uses the now selected table and returns a value of torque from that table which in block 180 is set equal to E and called torque low. In block 182 the parameter F is set equal to D plus 32, which adds 32 to the top address of the table in readiness to pick up the next table. At block 184 the Calculate Table Torque Routine is again called, and in block 186 the torque high value is returned as G, such that the parameter E gives the torque low value for a particular frequency equal to the integer portion of the tach frequency and the parameter G gives the torque high value corresponding to a higher frequency equal to the integer portion of the tach frequency +1. Knowing these two torque values corresponding to the dc input power at the integer tach frequency plus one, it is possible to interpolate between these two torque values to arrive at the torque corresponding to the actual tach frequency. This interpolation is performed by blocks 188, 190, 192, 194, and 196. To find the slope of the line between the two torques E and G, in block 188 the torque/tach frequency slope is set equal to the difference between the parameters G and E. In block 190 the parameter H is set equal to B times 64. In block 192 the fractional part of the tachometer frequency or delta tach is established as the tach frequency minus the parameter H, since the integer portion B times 64 when subtracted from the original number should give the remainder, which is the tach difference or fractional portion. In block 194 the parameter J is set equal to the delta total torque which is the additional torque that will be added to the torque low value E, and is the slope of the line calculated in block 188 times the delta tach divided by $2^6$ or 64. At block 196 this fractional torque is added to the torque low to give the calculated torque feedback.

Figure 5B:
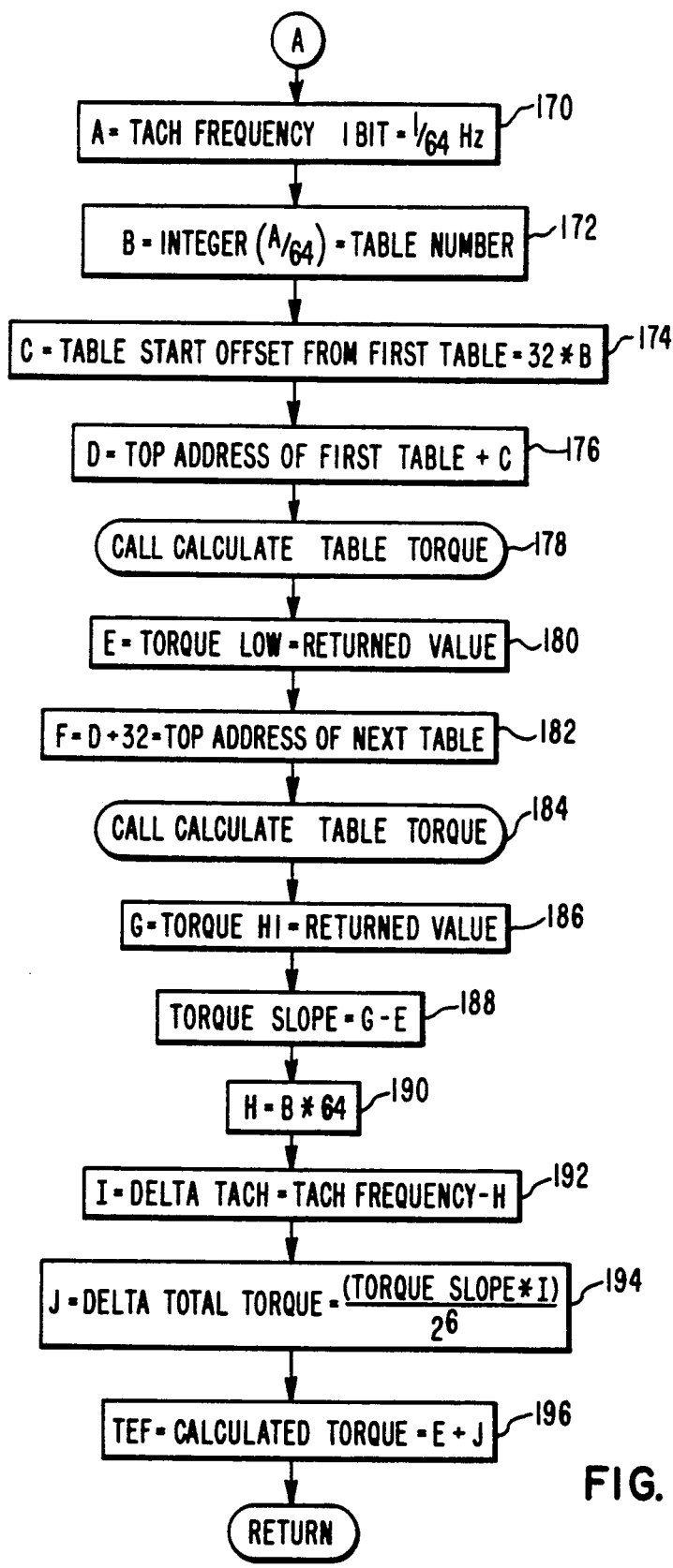
Figure 5C:
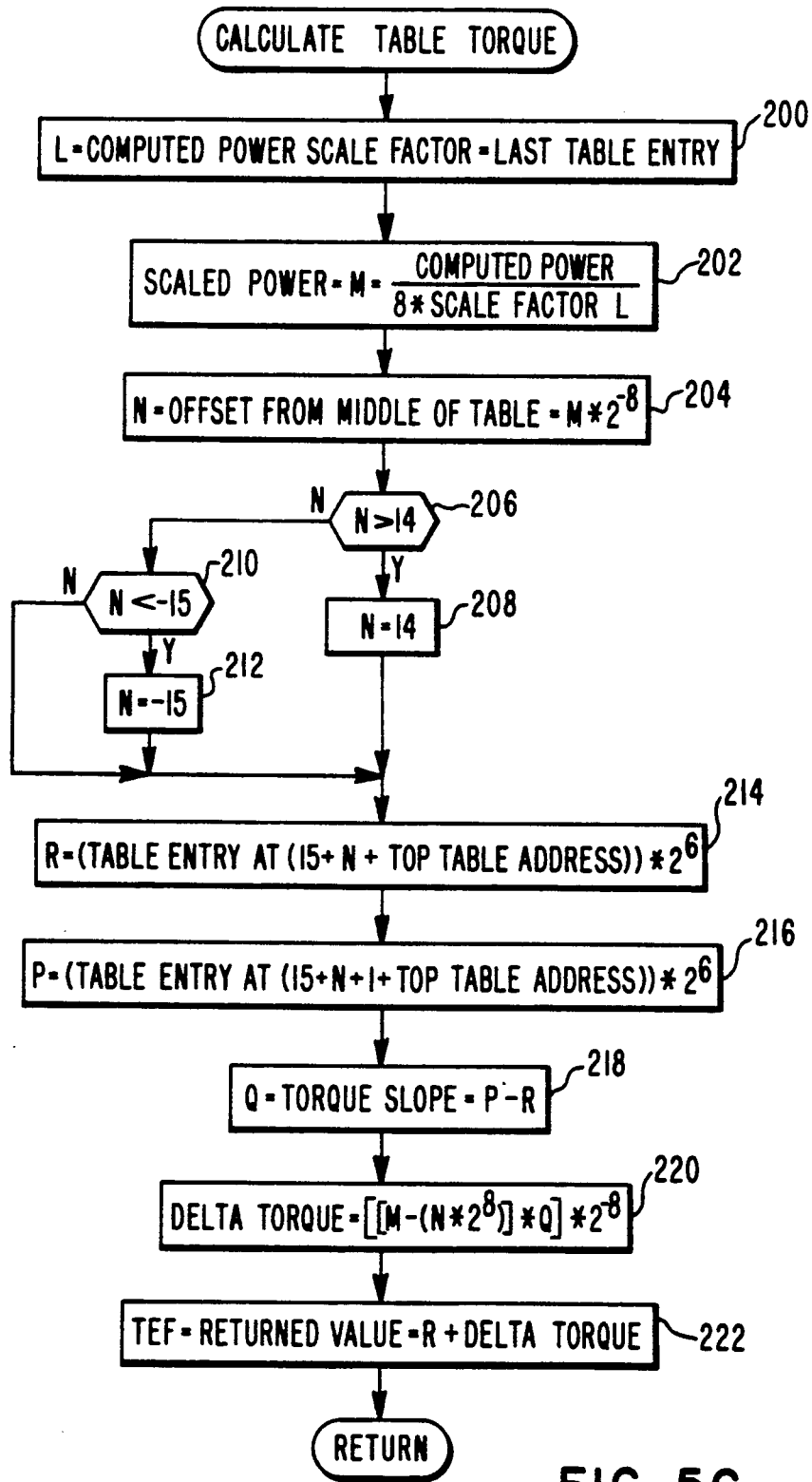

In FIG. 5C, the flow chart for the calculate table torque routine is provided. The selected table has 32 entries, and the last entry in the table is the scale factor used to compact the data and which is used to divide the computed power value. At block 200 the computed power scale factor is read as the last entry in the table. The middle entry of the table corresponds to zero computed power, while the first or top entry corresponds to regenerated power and the second to last or bottom entry corresponds to consumed power. So the table ranges from negative power at the top through zero power to positive power at the bottom. At block 202 the parameter M, which is scaled input power, is set equal to the computed power divided by (8×SCALE FACTOR L). At block 204 the parameter N is set equal to the scaled input Power M times $2^{-8}$ to properly scale the value, and this results in a number between $-15$ and 14 and represents the offset from the middle of the table. At block 206 a check is made to see if that number N is greater than 14. If the number is greater than 14, at block 208 since there are only 14 positive power entries to deal with, N is set equal to 14 and this means that entry 14 is desired. If the number is less than 14, at block 210 a check is made to see if the number is less than $-15$ since there are $-15$ entries from the zero power point. If the number is less than $-15$, this means that it should be clamped to $-15$ at block 212. In block 214 a table entry is selected from the table at the address equal to the offset from the middle of the table plus the top address of the table plus 15 because there are 15 entries prior to the middle of the table. The offset is a signed value either plus or minus depending upon which part of the table is being used, and R is set equal to that entry properly scaled by the number $2^6$ to convert to the desired torque units of measure. In block 216 the parameter P is set equal to the next higher entry from the table multiplied by $2^6$, and this gives two consecutive entries from the table. Each of these two torque values correspond to a different dc input power with 0 corresponding to a lower dc input power than does P. The actual dc input power is between these two dc input powers. To find the torque corresponding to the actual dc input power, it is necessary to interpolate between these two torque values. This interpolation is performed by blocks 218, 220, and 222. In block 218 the slope Q is determined by subtracting the two entries and since the entries in the table are a known amount different from each other the slope does not require any division. In block 220 the fractional part of the torque is determined, by multiplying the entry number N by $2^8$ and subtracting the product from the original computed power to result in the difference between the actual dc input power and the dc input power corresponding to the torque R. This power difference is multiplied by the slope Q and then multiplied by $2^{-8}$ for scaling purposes to arrive at the value delta torque. Delta torque represents the difference in torque represented by the difference between the actual dc input power and the dc input power associated with the torque R. In block 222, the torque corresponding to the actual dc input power is calculated by adding delta torque to the torque R. A return is then made from this calculate table torque routine.

The motor output torque is determined in relation to the dc input parameters and not by sensing the ac motor voltage and current and not by coupling a torque sensor to the motor. For a tachometer frequency less than or equal to 14.5 Hz, the table method of determination is utilized on the assumption that with a given power going into the motor there will be a particular torque out of the motor depending on applying substantially the same voltage. The determined motor torque may vary by as much as 5% due to loss calculation error and ignored parameters such as temperature, but that is close enough for transit motor control applications. At slow motor speeds up to base speed, the motor is in the constant volts per hertz operation, and with known voltage across the motor, there is going to be a correspondence between the motor output torque and the dc input power. The provided torque versus power tables are calculated by making a mathematical model of the motor and calculating what the corresponding power relationships are. At the higher speed range above base speed where the voltage may vary because the inverter runs out of voltage or braking is added, the torque versus power lookup tables are not satisfactory and it is better to calculate the power losses in relation to motor operation and then subtract the calculated power losses from the input power and divide the difference by the inverter frequency to determine the motor output torque. At higher speeds where the input power is large, then some error in the determined power losses by comparison is not significant in the determination of motor output torque. At the lower speeds where the inverter and motor losses are a large portion of the total input power, then the same error in the power loss calculation can result in an undesired large error in the determined motor output torque. From approximately 12 Hz operation to base speed, both methods of calculating motor torque yield comparable results. However, the loss calculation method does not need extensive memory consuming lookup tables as the lookup table method needs; therefore, the loss calculation method is preferred at about 12 Hz.

If the motor is braking at tach frequencies below 10 Hz, an additional problem arises, the torque versus input power relationship ceases to be a function. That is, there is more than one value of torque which corresponds to some input power. Therefore, it is not possible to use either method of torque calculation to determine the output torque of a braking motor at very low operational frequencies. On mass transit vehicles, it is desirable to perform friction braking at such low speeds; therefrom, this drawback is not a problem. In such a situation, an open loop estimate is made of the torque of the motor by saying that the torque is proportional to the slip of the motor. This estimation is not used by the controller as the controller will not attempt to perform closed loop motor braking at such low frequencies, but this estimation is included for completeness. Also if the tach frequency is negative, meaning the mass transit vehicle is rolling back in a direction opposite the desired direction of movements, a correct calculation of torque cannot be performed due to the same reason. Rollback recovery of such a transit vehicle is achieved by an open loop control operation where again the calculated torque is not used by the controller. For sake of completeness, the torque is estimated as a function of slip.

For the torque calculation lookup table method, a set of 16 different lookup torque tables is provided. Each lookup table is for a different tach frequency from 0 to 15 integer hertz values of tach frequency, and the torque is a function of input power plus a function of the speed or tach frequency. In this way 16 two dimensional lookup tables are used to provide the operation of a three dimensional lookup table, with the speed dimension provided by the plurality of tables. Each table is arranged into 31 different locations of power, with torque corresponding to power, so for each power value there is a torque value that corresponds. The power is broken up into 31 different points, with the middle entry in the table being zero computed power, 15 entries of negative power or braking prior to the middle and 15 entries of positive power after the middle. The 32nd entry is a scale factor used to compact the data. For each location there is stored the corresponding amount of torque. Each table is made big enough to cover the maximum expected output torque values. At the higher speed end of where the lookup table method is used, there may be 50 to 100 kilowatts of power to represent the maximum output torque, and at the low end, there may be 3 kilowatts of power to represent full output. Such a large dynamic range for dc input power would require very large lookup tables. To reduce the size of the tables a scaling factor is used to indicate the difference in watts between each table location. For example, at the high speed end there may be a difference of 3.3 kilowatts, while at the low speed end each location may represent a jump of about two hundred watts. Using a model of the motor apparatus, the losses are calculated by an offline calculation of the power losses, and when added together and added to the power due to the motor torque they should be equal to the input power to the system. Using such offline calculations, a lookup table at each integer tach frequency and representing the relationship between torque and input power at that tach frequency is calculated.

If the input power happens to fall between two points which it normally does, the table is used to obtain the torque value at the next lower power and the torque value corresponding to the next higher power, and assuming a straight line connecting those two torque values then interpolation in relation to the actual input power will determine the output torque. Also tach frequency is assumed to be either 0, 1, 2, . . . , or 15 Hz. Since the tach frequency is rarely equal to an exact integer value, some additional interpolation is required to determine the torque at the actual tach frequency. This interpolation is done by determining the torque values for the current input power for the two integer tach frequencies that bound the actual tach frequency. Each of these torque values is arrived at by using the interpolative procedure previously described to calculate torque from input power at the particular tach frequency. Interpolation is then used to arrive at a final torque feedback value somewhere between the intermediate torque values calculated from each of the two tach frequency tables. For example, for a tach frequency of $10\frac{1}{2}$ Hz, the torque value at 10 Hz is obtained and the torque value at 11 Hz is obtained and interpolation between these two torque values is used to determine the output torque.

In relation to the scaling, the input power is scaled so that 1 bit equals 7.6294 times $10^{-3}$ watts, and the torque is scaled so that 1 bit equals 0.1146 pound feet. The scaling byte in the table is set up so that 1 bit equals 15.625 watts per table location The table is a byte lookup table so there is a torque value range of 0 to 255, and the table values cannot be scaled in the same units as torque is scaled because torque can go up to 800 pound feet which would require more than 255 bits. Thusly each table torque value is equal to 0.1146 times $2^6$ pound feet.

Figure 6:
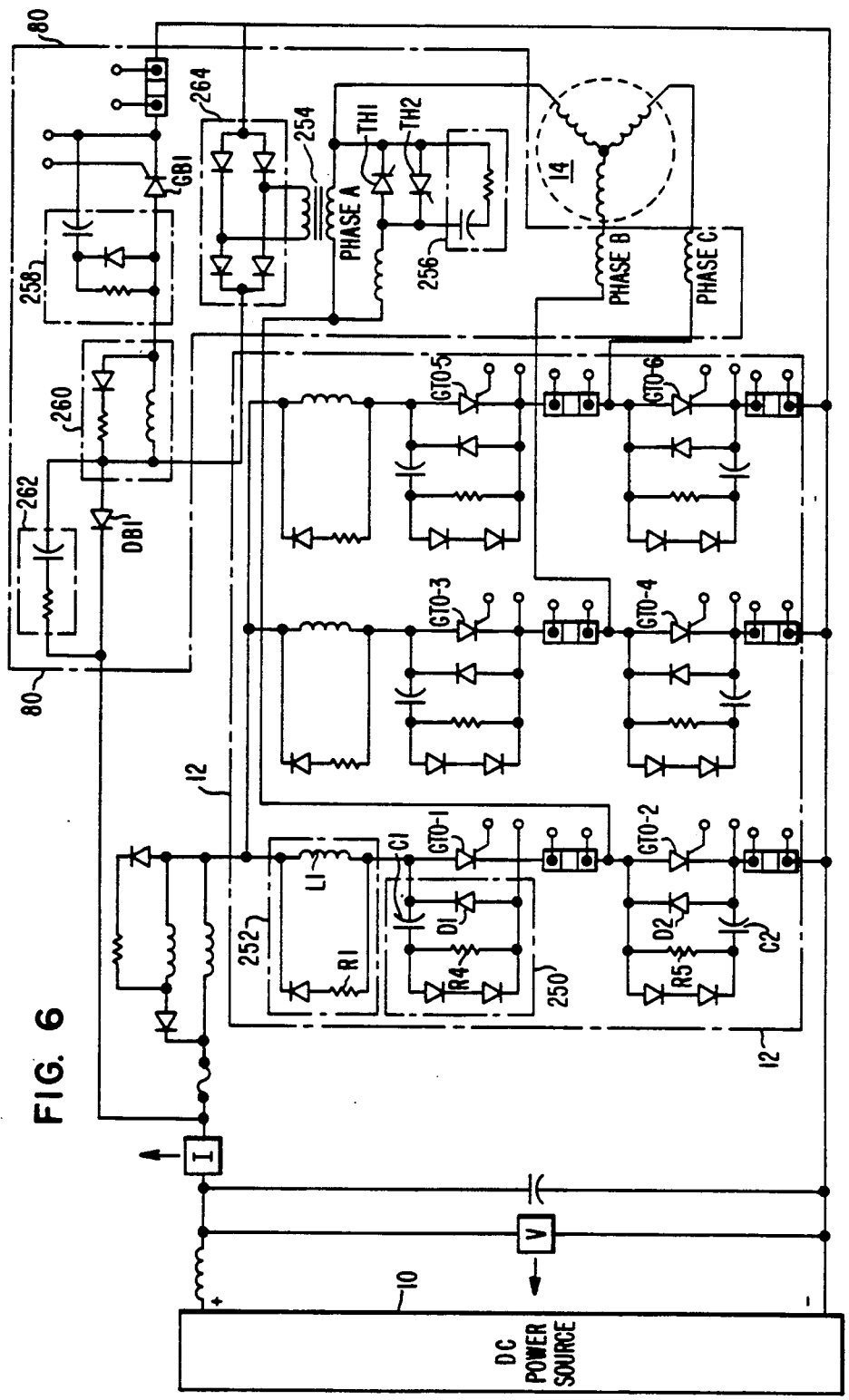
FIG. 6 schematically shows the inverter apparatus and braking apparatus provided for the control of an induction motor in accordance with the present invention.

In FIG. 6 there is schematically shown the inverter and brake circuit apparatus coupled for controlling an induction motor. The inverter 12 includes GTO-1 and GTO-2 switches connected to the DC power source 10 to energize pole A of the motor 14. The GTO-3 and GTO-4 switches are connected to the DC power source 10 to energize pole B of the motor 14. The GTO-5 and GTO-6 switches are connected to the DC power source 10 to energize pole C of the motor 14. The brake circuit apparatus 80 is shown for phase A of the motor 14. Identical brake circuits are provided but are not shown for each of phase B and phase C. The voltage snubber circuit 250 is shown for the GTO-1, and the current snubber circuit 252 is shown.

The thyristors TH1 and TH2 are shown for the brake circuit 80, and are operative to short circuit the transformer 254. The thyristor snubber circuit 256 is shown. The GTO switch GB1 is provided to modulate the voltage provided by the brake circuit 80 to the motor 14 when the thyristors TH1 and TH2 are not conducting. The GTO switch GB1 is provided with a voltage snubber circuit 258 and a current snubber circuit 260. The line diode DB1 includes a snubber circuit 262. The diode bridge 264 operative with the primary winding of the transformer 254.

Figure 7:
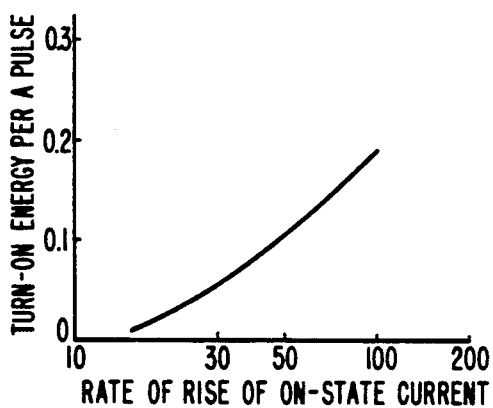
FIG. 7 shows illustrative prior art GTO turn-on current information.

In FIG. 7 there is shown the energy absorbed by a GTO switch when it is switched on.

Figure 8:
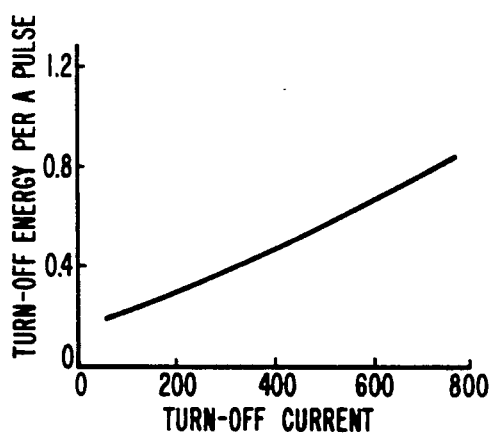
FIG. 8 shows illustrative prior art GTO turn-off current information.

In FIG. 8 there is shown the energy absorbed by a GTO switch when it is switched off.

A Toshiba SG800EX21 GTO was used for each pole of the inverter. The gate current for this GTO is 5 amperes, and the anode di/dt is determined by the pole inductor, such as L1 for pole A. The inductor L1 is 7 microhenries and with a 600 volt power source 46, this provides 85 amperes per microsecond di/dt, or 0.16 watt per pulse as shown in FIG. 7 For each turn on of the switch GTO-1 in pole A of the inverter 12, there is a loss of 0.16 watt of power. This loss is multiplied by the turn-on frequency per second to determine the power loss in watts per second.

The turn-off losses are determined with the curve shown in FIG. 8. This curve is assumed to be a straight line and using the slope of this line times the current through the GTO switch will establish the energy loss per turn-off, which is then multiplied by the number of turnoff switches per second to determine the resulting power loss.

DETERMINATION OF POWER LOSS RELATIONSHIPS

To estimate the torque in the ac motor, the dc input voltage and dc input current are measured by the microprocessor via an A/D converter. These two parameters are multiplied together to arrive at the input power to the inverter and braking circuit. By subtracting the losses of all components in the system, except rotor resistive losses in the motor, the micro can determine the useful portion of power that contributes to the torque force generated by the motor. The torque of the motor can then be determined by dividing the useful power by the inverter frequency. If rotor resistive losses were included in the system losses, rotor mechanical frequency would be used instead of inverter frequency to calculate torque.

SYSTEM LOSSES

The determined system losses can be broken down into four basic groups. The first of these groups consists of losses in the inverter, which are further broken down to GTO and diode conduction losses, GTO switching losses, and losses in the snubber circuits. The second group of system losses consists of electrical losses in the ac motor, which are stator resistive losses, magnetic core losses, harmonic losses, and stray losses. The third group of system losses consists of mechanical losses in the ac motor, which are composed of friction and windage losses in the motor. The fourth group of system losses is present only if the optional braking circuit is included in the motor control operation and consists of transformer braking losses, which are different depending upon whether the transformer is not presently being used and is shorted by the thyristors or whether the transformer is presently being used and the thyristors are kept off If the transformer is shorted by the thyristors, the transformer braking losses consist of the conduction losses of the thyristors only. If the transformer is not shorted by the thyristors, the transformer braking losses consist of snubber and switching losses in all semiconductors in the brake circuit, conduction losses in all semiconductors except the bridge diodes, conduction losses in the bridge diodes, resistive losses in the transformer, and magnetic core losses in the transformer. The total system losses are determined by adding up the losses in each group and then adding all of the groups together.

CALCULATING RMS MOTOR CURRENT

In order to calculate each group of these system losses, it is necessary to derive relationships between the loss to be calculated and various known parameters in the system. Many of the losses are a function of motor current. The microprocessor could read in the RMS value of motor current directly; however, due to the high cost of components necessary to perform such a function (isolated current to voltage transducer, wire to connect transducer to control logic module, and RMS voltage detector circuit, a relationship between RMS motor current and the known variables slip frequency, motor voltage, and constant V/F voltage was developed. This relationship is based on the principle that as long as the air gap flux is kept constant, current will be a known function of slip frequency, neglecting temperature variations. This known relationship between motor current and slip frequency at rated air gap flux is stored in a lookup table for the micro to access, such that the micro can find the value of motor current knowing the slip frequency if the motor is at rated air gap flux. It is also known that the motor current is directly proportional to the applied motor voltage given that slip frequency is held constant. Knowing this relationship, the motor current is calculated, even if the motor is not at rated air gap flux by using the following equation:

$$\text{motor current} = F(\text{slip}) * \frac{\text{motor voltage}}{DFS \text{ motor voltage}} \quad (16)$$

where F(slip) is the motor current vs. slip frequency relationship and desired motor voltage is the voltage necessary to produce rated air gap flux. By performing the lookup table function and the above calculations, the micro provides a good estimate of the present motor current. This motor current is then used in several loss calculations.

INVERTER LOSSES

Conduction losses in the GTOs and free-wheeling diodes in the inverter can be approximated as a function of motor current. The instantaneous conduction loss in a GTO or diode is equal to the current flowing through the device multiplied by the voltage drop across the device. It is unnecessary to calculate the instantaneous conduction loss, so an average conduction loss in the semiconductor devices is determined. The average voltage drop of the GTOs conducting an average amount of current is approximately 1.8 volts and the average voltage drop of the diodes conducting an average amount of current is approximately 1.2 volts. The voltage drop for both of these devices varies slightly with the amount of conducting current, however, the constant values of 1.8 and 1.2 volts are assumed. Assuming a constant voltage drop of 1.8 volts, the conduction losses in all of the inverter GTOs is defined as follows:

$$GTO \text{ Conduction Loss} = 1.8 * \frac{.9 * \text{Motor Current}}{4} * 6 \quad (17)$$

where loss is in watts, motor current is in amps RMS, 0.9 is used to convert RMS current to average current, 4 is due to each GTO conducting on average only ¼ of the time, and 6 is the total number of GTOs in the inverter. This equation is simplified to the following:

$$GTO \text{ Conduction Loss} = 2.43 * \text{Motor Current} \quad (18)$$

Similarly, assuming a constant voltage drop of 1.2 volts, the conduction losses in all of the inverter free-wheeling diodes is defined as follows:

$$\quad (19)$$
$$\text{Diode Conduction Loss} = 1.2 * \frac{.9 * \text{Motor Current}}{4} * 6$$

where loss is in watts, motor current is in amps RMS, 0.9 is used to convert RMS current to average current, 4 is due to each diode conducting on average only ¼ of the time, and 6 is the total number of free-wheeling diodes in the inverter. This equation is further simplified to the following:

$$\text{Diode Conduction Loss} = 1.62 * \text{Motor Current} \quad (20)$$

These equations are actually only partially valid because it is assumed that each diode and each GTO conducts only ¼ of the time. Actually, the GTOs will conduct more than ¼ of the time and the diodes will conduct less than ¼ of the time during motoring operation. This subtle shift in conduction time will actually increase the GTO losses and decrease the diode losses, but the difference is neglected for simplicity. In braking, the opposite effect will occur. Neglecting these shifts in conduction times, the final inverter conduction losses are equal to the GTO plus the diode conduction losses or:

$$\text{Inverter Conduction Losses} = 4.05 * \text{Motor Current} \quad (3)$$

This equation is used regardless of synthesis mode.

Inverter GTO switching losses are dependent upon the synthesis mode because they are dependent on switching frequency. In PWM and quasi six-step, the switching frequency hovers around 400 Hz, while in six-step, the switching frequency is equal to the inverter frequency; therefore, a need exists for an equation for PWM and quasi six-step and an equation for six-step. Switching losses in a GTO are calculated using data from the GTO manufacturer. Switching losses are composed of two components, turn-on losses and turn-off losses. GTO manufacturers supply curves relating turn-on losses to anode di/dt and curves relating turn-off losses to anode current. Curves for the GTOs used in the present inverter (SG800EX21) are shown in FIGS. 7 and 8. From these curves the following relationships are derived for turn on and turn off losses for the six GTOs in the inverter:

$$GTO \text{ Turn On Losses} = 0.26 * (400/2) * 6 = 312 \quad (21)$$

$$GTO \text{ Turn Off Losses} = 0011 * (0.9 * IM) * (400/2) * 6 = 1.2 * IM \quad (22)$$

Inverter GTO Switching Losses=312+(1.2*IM)  (4)

In the above equations, the 0.26 number is read from the turn on loss curve for an IGM of 5 amps and an anode di/dt of 85 amps/microsecond; the 400 represents the average switching frequency during PWM and quasi six-step; the 2 reflects that current will be flowing through the GTO only ½ of the time that the GTO is being switched, effectively reducing the switching frequency by a factor of 2; the 6 represents the number of GTOs in the inverter; the 0.0011 is the estimated slope of the curve in the turn-off loss curve; and IM is RMS motor current in amps. During six-step synthesis, the switching losses are reduced because the switching frequency is equal to the fundamental inverter frequency instead of 400 Hz; therefore, a different equation is used if the synthesis mode used is six-step. In six-step, all GTO turn-offs occur while current is flowing through the GTO, so that the effective switching frequency is not divided by two as was the case with the PWM and quasi six-step synthesis. Also, in six-step, turn-on losses are negligibly small because each GTO is switched on initially when the motor current is flowing in the opposite direction. Eventually the motor current switches direction and the GTO begins to conduct; however, under such circumstances the turn-on losses will be quite small. Also, during six-step, the turn-off losses per switching cycle will be higher because the current being switched off will normally be higher than the RMS value of the motor current. The exact magnitude of the current depends upon the phase angle between voltage and current. The current value where the GTOs are turned off is estimated to be about 1.4 times the RMS motor current, due to harmonics, etc. The equations that define the switching losses during six-step synthesis are as follows:

GTO Turn On Losses=0  (23)

$$GTO \text{ Turn Off Losses} = .0011 * 1.4 * IM * \text{Inverter Freq} * 6 \quad (24)$$
$$= .009 * IM * \text{Inverter Freq}$$

Inverter GTO Switching Losses=0.009*IM*Inverter Freq  (5)

Inverter snubber losses include the losses in the six voltage snubber circuits and three current snubber circuits in the inverter. Losses occur in the voltage snubber circuits due to the capacitor fully charging and discharging during GTO turn-on and turn-off times. Losses occur in the current snubber circuits due to current building and falling in the inductor during GTO turn-on and turn-off times There are basically four different conditions that exist in each inverter pole that cause energy to be dissipated in the snubber circuits. Case number one is when the motor current is negative with the direction of current flow out of the motor, and GTO-2 is off and is then switched on. In this case, the motor current is initially flowing through diode D1 and L1, but after GTO-2 is turned on the current will flow through GTO-2. In the meantime, the voltage snubber capacitor C2 for GTO-2 must discharge a voltage of 600 volts where the energy dissipated equals 0.5 *C*V²; the voltage snubber capacitor C1 for GTO-1 must charge up to 600 volts; the current through L1 must stop flowing; and the diode D1 must turn off. As soon as GTO-2 is turned on, the current through L1 starts to decrease and the voltage across the GTO-2 snubber capacitor begins to decrease. As soon as the current through L1 reaches zero, it reverses direction and begins to charge up the GTO-1 snubber capacitor. Also diode D1 takes about 2.5 microseconds to turn off so it will conduct current in the reverse direction for this small period of time. The GTO-1 snubber capacitor will charge beyond the DC line voltage because of the presence of the snubber inductor and stray circuit inductance. As soon as the GTO-1 snubber capacitor voltage passes the line voltage, the current in L1 and the stray inductance begins to decrease. Some of this energy is temporarily transferred to the capacitor and the rest is dissipated in R1. The energy transferred to the capacitor accounts for the overshoot voltage in the snubber capacitor. Much of this energy is soon quickly dissipated in R4 and R1 with the remainder of the energy fed back to the DC power source. The amount of losses in the pole's snubber resistors R1, R4, and R5 can be shown to equal:

$$\text{Case \#1 Snubber Loss} = (0.5*C*V^2) + (0.5*L*(IL^2+ID^2)) \quad (25)$$

where the first term represents losses due to the GTO-2 snubber capacitor discharging and the second term represents losses due to the GTO-1 snubber capacitor charging and snubber inductor dissipating energy. The energy stored in the GTO-1 capacitor at the end of the switching cycle is not considered as a loss because it is stored energy at this time. In the equation, C is 2 microfarads and represents the snubber capacitance; V is the DC line voltage; L is 9 microhenries and represents the combination of snubber inductance (7 microhenries) and stray inductance (2 microhenries); IL is the peak current through L1 attained while charging the GTO-1 snubber capacitor and not counting diode current; and ID is the peak reverse diode current through D1. IL and ID are further defined by the following equations:

$$IL=V*(C/L)^{0.05} \quad (26)$$

$$ID=V/L*Trr \quad (27)$$

where V, C, and L are defined earlier and Trr is the reverse recovery of the diode and is equal to about 2.5 microseconds. Substituting these equations into the above snubber loss equation (25) results in the following equation for the losses in one pole:

$$\text{Case \#1 Snubber Loss}=C*V^2+0.5*(V^2/L)*Trr^2 \quad (28)$$

Case number two is where the motor current is positive and flowing through GTO-1 when GTO-1 is turned off. In this case the motor current is initially flowing in L1. When GTO-1 is turned off, the GTO-1 snubber capacitor begins to charge up with the motor current. Also the GTO-2 snubber capacitor begins to discharge, dissipating the energy in the R5 resistor (energy dissipated equals 0.5 *C*V²). Once, the voltage across the GTO-1 snubber capacitor reaches the dc line voltage, the current in the snubber inductor L1 and the stray inductance begins to decrease. The energy in these inductors at this time is equal to 0.5*L*I² where I is the motor current. All of this energy is either dissipated in resistor R1 or temporarily transferred to the GTO-1 snubber capacitor in the form of an overshoot voltage.

This temporary overcharge of the capacitor is soon dissipated in resistor R4. As one can see, the diode and reverse L1 current are not a factor in case number two and the losses for case number two are defined as follows:

$$\text{Case \#2 Snubber Loss} = (0.5 * C * V^2) + (0.5 * L * I^2) \quad (29)$$

where C, V, and L have been previously defined and I is the RMS motor current.

Case number three occurs when the motor current is positive and GTO-1 is switched from off to on. Initially the motor current is flowing in diode D2, but after GTO-1 is turned off, the motor current flows through GTO-1 and inductor L1. This case parallels case number one described previously and the equation for snubber losses for this case can be shown to be identical to the snubber losses for case number one.

Case number four occurs when the motor current is negative and flowing through GTO-2 which is on. Then GTO-2 is turned off, and the current ends up flowing through diode D1 and inductor L1. This case parallels case number two described previously and the equation for snubber losses for this case can be shown to be identical to the snubber losses for case number two.

We have so far described the energy losses in the snubbers of one pole for all possible switching cycles. To arrive at a power loss, we need to multiply these energy losses by the number of times each case occurs per second and by the number of poles in the inverter. During PWM and quasi six-step synthesis, each of the four cases occurs at a frequency equal to half the switching frequency. Therefore, in PWM and quasi six-step, the following equation applies:

$$\text{Inverter Snubber Losses} = (2 * \text{Case \#1 Loss} + 2 * \text{Case \#2 Loss}) * F/2 * 3 \quad (30)$$

$$\text{Inverter Snubber Losses} = \quad (31)$$
$$((2 * ((C * V^2) + (.5 * (V^2/L) * Trr^2))) +$$
$$(2 * ((.5 * C * V^2) + (.5 * L * I^2))) * F/2 * 3$$

where F is the switching frequency.

In six-step synthesis, GTO-1 is never turned on when motor current is positive and GTO-2 is never turned on when motor current is negative; therefore, cases number one and three do not occur in six-step. However, cases two and four occur at a frequency equal to the switching frequency which is equal to the fundamental inverter frequency in six-step. Also, when a switch occurs in six-step the motor current is usually higher than the RMS motor current. As mentioned in previous loss calculations, the motor current is approximated to be 1.4 times the RMS motor current at this switch point. From this information the following snubber loss equation applies when in six-step synthesis:

$$\text{Inverter Snubber Losses} = (2 * \text{Case \#2 Loss}) * F * 3 \quad (32)$$

OR $$\text{Inverter Snubber Losses} = (2 * ((0.5 * C * V^2) + (0.5 * L * (1.4 * I)^2))) * F * 3 \quad (33)$$

Using an average switching frequency of 400 Hz for PWM and quasi six-step, a 2 microfarad capacitor, 9 microhenries of total inductance, and a diode reverse recovery time of 2.5 microseconds, the snubber loss equations reduce to the following:

$$\text{Inverter Snubber Losses (PWM and Quasi Six-Step)} = ((1.0*10(-5)*V^2) + (1.35*10(-5)*I^2))*F \quad (34)$$

AND $$\text{Inverter Snubber Losses (Six-Step)} = ((6.0*10(-6)*V^2) + (5.3*10(-5)*I^2))*F \quad (35)$$

where V is DC line voltage, I is RMS motor current, and F is the inverter switching frequency which for six-step is equal to the fundamental inverter frequency.

MOTOR ELECTRICAL LOSSES

The first motor loss to be defined is the stator resistive loss. This loss is caused by the motor stator having resistance which dissipates power as the fundamental motor current flows through the stator. The following equation defines this loss:

$$\text{Motor Stator Resistive Loss} = 3 * R * I^2 \quad (36)$$

where the R is the stator resistance and I is the fundamental motor current in RMS amperes. The factor of 3 is added to account for the fact that in a three-phase motor there are three stator windings. The stator resistance actually increases with temperature, but the resistance variation is not great enough to require measuring the motor temperature in order to compensate for this variation. A constant value is assumed for the stator resistance of the motor of 0.0204 ohms. The above equation for this application becomes as follows:

$$\text{Motor Stator Resistive Loss} = 0.0612 * I^2 \quad (37)$$

Core losses in the motor are magnetizing losses. The flux in the motor follows the sine wave motor current; however, energy is lost as the flux changes polarity, due to hysteresis properties of the motor. When operating in the constant volts per hertz mode, the motor flux is kept at a constant amplitude, and core losses are, therefore, proportional to the fundamental inverter frequency. Using core loss data from the motor manufacturer for the particular motor enables deriving the following equation for core losses while operating in the constant volts per hertz mode (the motor data consists of saying that there are 1864 watts of core losses in the motor, given that the motor is at the rated speed of 45 Hz and rated line-to-line voltage of 420 volts):

$$\text{Core Loss} = 1864 * (\text{Inverter Freq}/45) = 41.4 * \text{Inverter Freq} \quad (38)$$

When not operating in the constant volts per hertz mode, the above formula does not apply because flux is no longer being kept at a constant amplitude; therefore, a different equation which allows for variation in the motor flux must be developed. The following equation is used in such a case:

$$\text{Core Loss} = 1.162 * (V/F)1.6 * F \quad (39)$$

where V is line-to-line motor voltage and F is fundamental frequency of the applied inverter voltage waveforms.

Stray losses are a collection of extraneous electrical motor losses which are not included in any of the other motor losses. A rough estimate of these stray losses indicates that they are proportional to the motor torque value. A stray loss of 1630 watts at a torque of 768 LB-FT is read from motor data for the motor used in the AC drive setup. From this data the constant is calculated which relates stray losses to motor torque as follows:

$$Stray\ Loss = C*Motor\ Torque$$

$$C = Stray\ Loss/Motor\ Torque$$

$$C = 1630/768 = 2.12$$

$$Stray\ Loss = 2.12*Motor\ Torque \quad (11)$$

Where core loss is in watts and motor torque is the last calculated motor torque in units of LB-FT.

Harmonic losses are caused by the harmonic currents flowing in the motor which produce resistive heating of the motor. These losses are functions of several parameters such as synthesis mode used, fundamental inverter frequency, and torque output of the motor. It is extremely difficult to derive equations for the harmonic losses, correlate the data, and form a combination of lookup tables and equations which allow for the calculation of these harmonic losses. An accurate but very time consuming way is to use a spectrum analyzer and measure the RMS voltage and current values for all major harmonics. The spectrum analyzer can also be used to then measure the phase angle between the voltage and current for each harmonic. Knowing these three parameters the losses are calculated due to each harmonic using the following equation:

$$Harmonic\ Power = V*I*Cos(Phase\ Angle) \quad (41)$$

After calculating the power loss due to each harmonic, an addition of power losses from each harmonic provides the total loss due to all of the harmonics. Data must be taken at several operating frequencies and motor torques. By gathering enough information, the data is correlated to arrive at a combination of lookup tables and equations which enable the processor to calculate the harmonic losses under all operating circumstances. Another much easier method is to measure the input power to the entire AC drive system (input power to inverter) and measure the output torque of the motor at various operating frequencies and motor loads (along with other helpful parameters such as motor current, motor temperature, etc.). The following formula calculates remaining losses in the system. These remaining losses should be approximately equal to the harmonic losses providing that the derived loss equations are reasonably accurate:

$$Remaining\ Loss = P - ((T*F) + Loss) \quad (42)$$

Where P is input power, T is motor torque, F is fundamental inverter frequency, and loss is total defined losses in the system (not including rotor losses). After calculating harmonic losses for several operating frequencies and motor torques, the data can be correlated to arrive at a combination of lookup tables and equations that define harmonic losses over all operating conditions. This latter method was used to formulate equations and lookup tables used by the micro to calculate the harmonic losses in the present AC drive system.

MOTOR MECHANICAL LOSSES

Windage losses in the motor are the losses due to both the rotor and fan displacing air as the rotor turns. It is well known that these losses are proportional to the rotor speed cubed by some proportionality constant. This constant is determined from data supplied by the motor designer. For the motor used in the present system, the equation for windage losses is as follows:

$$Windage\ Losses = 599*(RPM/1800)^3 \quad (12)$$

where RPM is the speed of the rotating shaft in RPMs.

Friction losses in the motor are the losses caused by the friction between the motor shaft and housing as the rotor turns. It is well known that these losses are directly proportional to the rotor speed by some proportionality constant. Like windage losses, this constant is determined from data supplied by the motor designer. For the motor used in the present system, the equation for friction losses is as follows:

$$Friction\ Losses = 104*(RPM/1800) \quad (13)$$

where RPM is the speed of the rotating shaft in RPMs.

BRAKING TRANSFORMER LOSSES

If the braking transformer is included the resulting losses must be calculated and added to the losses calculated so far. If the braking transformer is not being used, such that the thyristors on the motor or primary side of the transformer are gated on and thus are shorting out the primary side of the transformer, the transformer and devices on the primary side of the transformer are not conducting any current and thus have no power losses. However, the thyristors have a voltage drop associated with them and are conducting the motor current; therefore, the thyristors have conduction power losses. Assuming an average voltage drop of 1.5 volts for the thyristors and realizing that each of the six thyristors conducts current only half of the time, the equation for brake thyristor conduction losses is:

$$\begin{aligned} Brake\ Thyristor\ Conduction\ Loss &= 1.5*((.9*I) \\ &\quad /2)*6 \\ &= 4.05*I \end{aligned} \quad (14)$$

Where 1.5 is the thyristor voltage drop, I is RMS motor current in amps, 0.9 converts RMS motor current to average motor current, 2 is due to each thyristor conducting only ½ of the time, and 6 is the total number of braking circuit thyristors.

If the braking thyristors are not being gated on, they will each turn off the next time their respective sinusoidal motor current crosses zero. When all thyristors are off, the braking transformer and the components on the primary side of the transformer will conduct current and, therefore, have losses associated with them. In the following equations, a DC line voltage of 700 volts is assumed instead of the 600 volt nominal line assumed previously. Using this higher voltage is justified because during times when transformer braking is used, a considerable amount of current is being regenerated to the DC line. In most cases, the line will not take all of this current; therefore, the voltage will rise above the nominal 600 volt line to a value of around 700 volts.

Braking circuit snubber and switching losses consist of losses in the thyristor snubber circuits due to the subsequent charging and discharging of the capacitor in the circuits; GTO turn-on losses; GTO turn-off losses; GTO voltage snubber losses due to the subsequent charging and discharging of the capacitor in the circuits; GTO current snubber losses due to the building up and building down of current in the inductor in the circuits; and line diode voltage snubber losses due to the charging and discharging of the capacitor in the circuits.

Thyristor snubber circuit losses occur because each time the GTO on the primary side of the transformer is switched off, the capacitor in this snubber circuit charges to the value 700*0.9, plus or minus depending on the direction of current through the transformer, assuming a DC line of 700 volts and a transformer turns ratio of 0.9. Each time the GTO discharges, this capacitor must discharge all of this voltage. Each GTO is turned on and off at twice the fundamental inverter frequency; therefore, each snubber circuit charges twice and discharges twice each fundamental inverter period. Each charge cycle and discharge cycle is through the snubber resistor. The energy losses in watt-seconds in this resistor for either a charge or discharge cycle are equal to $\frac{1}{2}*C*V^2$ where C is the value of the snubber capacitor in farads and V is the voltage change in the capacitor of 700*1.1. To compute the power losses in all three thyristor snubber circuits the following equation is used:

$$Braking\ Thyristor\ Snubber\ Loss = \tfrac{1}{2}*C*(700*0.9)^2*4*F*3$$

where F is the fundamental inverter frequency in hertz; 4 is the total number of charge and discharge cycles per fundamental inverter period; and 3 is the number of thyristor snubber circuits. With a capacitor value of 1 microfarad, this equation reduces to the following:

$$Braking\ Thyristor\ Snubber\ Loss = 2.4*F$$

Braking GTO turn-on losses are determined the same way as the inverter GTO turn-on losses were. From the GTO manufacturer's curves, using an anode current di/dt of 85 amps per microsecond, and an IGM of 5 amps, the value of 0.16 watt-sec/pulse is determined from the curve. Using this value, the following equation is derived for braking GTO turn-on losses:

$$Braking\ GTO\ Turn\ On\ Loss = 0.16*2*F*3 = 0.96*F$$

Where F is the fundamental inverter frequency; 2*F is the number of times each braking GTO is turned on each second; and 3 is the number of braking GTOs in the system.

Braking GTO turn-off losses are determined in a manner similar to the way the inverter GTO turn-off losses were; however, to simplify matters a constant average GTO turn-off anode current of 350 amps is assumed. From the GTO manufacturer's curves, using this 350 amp figure, the value of about 0.5 watt-sec/pulse is determined. Using this value, the following equation is derived for braking GTO turn-off losses:

$$Braking\ GTO\ Turn\ Off\ Loss = 0.5*2*F*3 = 3*F$$

Where F is the fundamental inverter frequency; 2*F is the number of times each braking GTO is turned off each second; and 3 is the number of braking GTOs in the system.

Braking GTO voltage snubber losses are similar to the inverter GTO voltage snubber losses. When turning a braking GTO off, the capacitor in the snubber circuit charges up to a voltage of 700 volts, assuming a 700 volt operating voltage, via a diode and since the charging is via a diode, there are few losses associated with charging the capacitor. When turning the braking GTO on, the capacitor must discharge this voltage through a resistor. The losses in the resistor are equal to the total energy stored in the capacitor which is defined as $\frac{1}{2}*C*V^2$. By multiplying this energy by the number of times each second that the capacitor is discharged, equal to the brake GTO switching frequency which is equal to 2 times the fundamental inverter frequency, and the number of braking GTO voltage snubber circuits (3) the power losses are calculated:

$$Braking\ GTO\ Voltage\ Snubber\ Loss = \tfrac{1}{2}*C*700^2*2*F*3$$

Using a snubber capacitor having 2 microfarads of capacitance, this equation reduces to the following:

$$Braking\ GTO\ Voltage\ Snubber\ Loss = 2.94*F$$

Just like the inverter voltage snubber capacitors, due to current snubber inductance and stray inductance, the snubber capacitor actually charges to more than 700 volts; however, these extra losses are included in the current snubber equation.

The braking circuit current snubber losses are similar to the inverter current snubber losses. When turning the braking GTO on, the current in the snubber inductor builds up. When the braking GTO is subsequently turned off, the current builds down to zero by dissipating the energy in the snubber resistor, ignoring the energy that gets transferred to the voltage snubber capacitor. During current build-up, the energy level reached in the inductor is equal to $\frac{1}{2}*L*(0.9*I)^2$ where L is the inductance, 0.9 is the transformer turns ratio, and I is the motor current at the time the GTO is turned off, therefore 1.1*I is the current in the inductor at time of turn-off. By multiplying this energy by the number of times each second that the inductor current is built down, equal to the brake GTO switching frequency which is equal to 2 times the fundamental inverter frequency, and the number of braking GTO current snubber circuits (3) the power losses are calculated:

$$Braking\ GTO\ Current\ Snubber\ Loss = \tfrac{1}{2}*L*(0.9*I)^2*2*F*3$$

This equation is further simplified by using an average motor current at time of GTO turn-off of 400 amps, since transformer braking generally produces motor currents of around rated current magnitude. If greater accuracy of loss estimation is required, a current proportional to RMS motor current can be used instead of a constant value of 400 amps. Using a current snubber inductance of 7 millihenry plus a stray inductance of 3 millihenry, this equation becomes:

$$Braking\ GTO\ Current\ Snubber\ Loss = 3.9*F$$

The line diode snubber loss is due to the charging up of the snubber capacitor to the 700 volt line voltage everytime the braking GTO is turned on and discharging to zero volts everytime the braking GTO is turned off. Both charging and discharging paths are through the snubber resistor so losses equal to $\frac{1}{2}*C*700^2$ occur at every GTO turn-on or turn-off transition. There is a total number of 4*F transitions per second. The power equation for the line diode snubber losses in all three phases of the braking transformer circuit is as follows:

$$\text{Braking Line Diode Snubber Loss} = \tfrac{1}{2} {}^*C {}^* 700^2 {}^* 4 {}^*F {}^* 3$$

Using a snubber capacitance of .5 microfarads, this equation becomes:

$$\text{Braking Line Diode Snubber Loss} = 1.47 {}^* F$$

Since the equations are established for all of the snubber and switching losses in the braking transformer circuit as a function of a constant multiplied by fundamental inverter frequency, these losses are lumped together into one equation in order to save the micro time in the calculations. This equation is as follows:

$$\text{Braking Switching Losses} = 14.7 {}^* F$$

The line diode in each phase of the braking circuit conducts current whenever the GTO is off and the GTO conducts current whenever the GTO is on. Instantaneous line diode conduction losses are equal to the product of the instantaneous voltage drop of the device and the current being conducted by the device. Since average power loss is needed, average diode voltage drop is selected of 1.2 volts for the diode. Also, the average current through the diode is used. The combined conduction losses of all three line diodes using these simplifications are determined using the following equation:

$$\text{Braking Line Diode Conduction Loss} = 3{}^*((1/1.1){}^*(0.9{}^*I)){}^*1.2{}^*\text{Angle}/180$$

Where 1.1 is the transformer turns ratio, I is the RMS motor current, 0.9 converts RMS motor current to average motor current, 1/1.1 converts average motor current to average diode current, 1.2 is the diode voltage drop, angle is in degrees and represents the portion out of each 180 degrees that the braking GTO is off, and angle/180 is the percentage of time that the diode is conducting.

Braking GTO conduction losses are similarly determined using an average GTO voltage drop of 1.8 volts:

$$\text{Braking GTO Conduction Loss} = 3{}^*((1/1.1){}^*(0.9{}^*I)){}^*1.8{}^*(180\text{-Angle})/180$$

The term angle/180 is replaced by (180-Angle)/180 to indicate the percentage of time that the GTO is conducting.

By looking at the line diode and GTO conduction loss equations, if the voltage drops in each device were equal then the total conduction losses of all GTOs and line diodes in the braking circuit would reduce to the following equation:

$$\text{Braking Conduction Loss} = 3{}^*((1/1.1){}^*(0.9{}^*I)){}^*\text{Voltage Drop}$$

This single equation greatly simplifies the two separate equations. Voltage drop is set equal to 1.6 volts by averaging the diode drop of 1.2 and the GTO drop of 1.8 volts. 1.6 is chosen instead of the actual average of 1.5 because the GTOs are normally conducting a greater percentage of time than are the diodes. Including this voltage drop of 1.6 volts the equation becomes:

$$\text{Braking Conduction Loss} = 3.9 {}^* I$$

The diodes in the full wave rectifier bridge also have conduction losses associated with them. Two of the diodes are always conducting no matter what the GTO is doing. Assuming a diode voltage drop of 1.2 volts in these diodes, the equation for diode bridge conduction losses in all three phases is derived:

$$\text{Braking Bridge Loss} = 3{}^*((1/1.1){}^*(0.9{}^*I)){}^*1.2{}^*2$$

Where (1/1.1)*(0.9*I) is the average current through the diodes, I is the RMS motor current, 1.2 is the voltage drop at all times. Simplifying, this equation becomes:

$$\text{Braking Bridge Loss} = 5.9 {}^* I$$

Transformer resistive losses are $I^2 {}^* R$ losses where I is the motor current or secondary current and R is the total resistance of both the primary and secondary windings of the transformer. The primary winding resistance is referred to the secondary side by multiplying the actual resistance in the primary side by the turns ratio of 0.9 squared. Assuming a transformer temperature of 130 degrees centigrade, the resistance of the transformer is about 0.08 ohms. This value will vary with temperature, but in an effort to keep things simple, this resistance variation is ignored. The equation used to calculate transformer resistive losses is as follows:

$$\text{Braking Transformer Resistive Loss} = 0.08 {}^* I^2$$

Where I is the RMS motor current.

The core loss in the transformer is caused by the variation of the flux in the iron core and depends upon the frequency, the maximum value of the flux density as determined by the excitation voltage, the shape of the excitation waveform, and the construction of the transformer. A core loss equation which defines the losses in our transformer is as follows:

$$\text{Braking Transformer Core Loss} = 307 {}^* 10^{\wedge}(0.4345 {}^* V/F - 1.272)$$

Where V is line-to-line RMS voltage across the transformer and F is the fundamental inverter frequency.

LOSS CALCULATION CONCLUSIONS

In the preceding text, the numerous equations used by the microprocessor to calculate losses in the AC drive system have been presented. Some of the more complex equations which involve non-integer powers are actually performed with the assistance of lookup tables.

TORQUE CALCULATIONS USING LOOKUP TABLES

At very low frequencies where losses become an appreciable percentage, more than half of the overall system power, a very accurate loss model would be required to achieve any type of accurate torque calculation using the (input power−losses)/frequency equation (1) to calculate torque. To avoid this problem, lookup tables relating torque to input power and frequency were developed. A different lookup table exists for each hertz of tach frequency from zero to 15 Hz. Each table represents the relationship between torque and input power. Since at each speed and load condition the same voltage is always applied to the motor, true at low frequencies of below the base speed of about 45 Hz, each time that condition exists, there exists a definite relationship between the motor torque and the input power, such that as motor torque increases, so does the input power. Therefore, it is practical to calculate the torque by simply calculating the input power and using this torque/power relationship to arrive at an answer. The loss model is used to calculate these torque/power relationships at each speed off-line. The results are gathered into lookup tables which the micro uses on-line for the torque calculation.

At higher frequencies, the on-line loss calculation method is preferred because it allows for much more flexibility such as not requiring operation at constant volts per hertz all of the time. Above base speed, where such constant volts per hertz operation is not feasible, the table method would be very difficult to use because somehow the micro would have to compensate for voltage differences. Such a compensation is very difficult.

Even though the lookup tables allow the calculation of torque at lower frequencies than does the on-line loss model calculations, calculating braking torques at very low frequencies below about 10 Hz is not practical using any method that is based upon reading only input power. At these very low frequencies, the relationship between torque and input power ceases to be a function for brake torques. If braking operation of the motor is desired at such low frequencies, an open loop type control is used because of this difficulty to measure torque.

We claim:

1. In apparatus for determining the output torque of an AC motor in a transit vehicle energized by an inverter operative with a DC power supply, the combination of first means connected with said power supply for establishing the input DC power provided to the inverter by said power supply, second means connected with said motor for establishing the motor speed, third means for establishing the inverter losses as a predetermined function of motor current with the motor current being determined from an expression equal to a motor current versus constant slip frequency relationship as a factor multiplied by the ratio of the voltage across the motor when divided by the desired voltage across the motor for a constant volts per hertz operation of the motor, fourth means for establishing motor losses as a predetermined function of said determined motor current, inverter frequency and determined harmonic losses, fifth means for establishing friction and windage losses as a predetermined function of motor speed, sixth means for establishing the output torque in relation to the difference between said input DC power minute the sum of the inverter losses, the motor losses and the friction and windage losses when divided by said inverter frequency.

2. The apparatus of claim 1, including means for establishing that the motor speed is greater than said predetermined motor speed before the output torque is established by the sixth means.

3. The apparatus of claim 1, including seventh means for establishing, as an alternative to said sixth means, the output torque in relation to a plurality of torque versus power lookup tables for the motor as a function of predetermined motor speed at rated air gap flux for said motor.

4. An apparatus for determining the on-line output torque for any frequency in a broad array of operating frequencies of an AC motor having a rated air gap flux and energized through an inverter by a DC power source supplying a voltage and a current to the inverter, said inverter and motor being adapted to operate at a requested frequency within the array of frequencies while in selected braking and synthesis modes of operation, the combination of:

means connected with said power source for measuring the input DC power from said power source, a portion of which power is deliverable to the motor to produce output torque in relation to the product of said voltage and said current at said requested frequency while in said selected mode;

means connected with the motor for measuring the motor speed, means providing a first determination of the outpt torque as a function of the deliverable power and the motor speed when the motor speed is greater than a predetermined motor speed, said output torque first determination providing means including means for establishing the motor current as a function of the motor slip and the voltage across the motor and establishing the inverter frequency, means for determining the inverter losses as a function of motor current, and means for determining the motor losses as a function of the inverter frequency an the motor speed, and means providing a second determination of the output torque as a function of the deliverable power when the motor is operating at rated air gap flux and the motor speed is less than said predetermined motor speed, said first and second output torque determinations being provided in real time while operating the motor.

5. An apparatus for determining the on-line output torque for any frequency in a broad array of operating frequencies of an AC motor having a rated air gap flux and energized through an inverter by a DC power source supplying a voltage and a current to the inverter, said inverter and motor being adapted to operate at a requested frequency within the array of frequencies while in selected braking and synthesis modes of operation, the combination of:

means connected with said power source for measuring the input DC power from said power source, a portion of which power is deliverable to the motor to produce output torque in relation to the product of said voltage and said current at said requested frequency while in said selected mode;

means connected with the motor for measuring the motor speed, means providing a first determination of the output torque as a function of the deliverable power and the motor speed when the motor speed is greater than a predetermined motor speed, with the first determination of the output torque including a calculation of respective power losses in relation to the inverter operation, and in relation to the motor operation, with the output torque of said first determination means being determined as the difference between the input power and the calculated power losses considered in relation to the inverter frequency, and means providing a second determination of the output torque as a function of the deliverable power when the motor is operating at rated air gap flux and the motor speed is less than said predetermination motor speed, said first and second output torque determinations being provided in real time while operating the motor.

6. In a method of determining the on-line output torque of an AC motor energized by an inverter operative with a DC power source, the steps of:

determining the input power to said motor in relation to the power supplied by the power source to the motor through the inverter, sensing the rotational speed of the motor with a tachometer having an output frequency, selecting a first determination of motor output torque when the tachometer frequency is greater than a first predetermined frequency, including establishing the inverter losses in accordance with the motor current, establishing the motor losses in accordance with the inverter frequency and establishing friction and windage losses in accordance with the motor speed, and selecting a second determination of motor output torque when the tacometer frequency is less than said first predetermined frequency.

7. In a method of determining the on-line output torque of an AC motor energized by an inverter operative with a DC power source, the steps of:

determining the input power to said motor in relation to the power supplied by the power source through the inverter, sensing the rotational speed of the motor with a tachometer having an output frequency, selecting a first determination of motor output torque when the tachometer frequency is greater than a first predetermined frequency, with the first determination of motor outpt torque being in relation to the sum of the respective power losses in the inverter and in the motor and with the output torque of said first determination being determined in relation to the input power minus the sum of the power losses, and selecting a second determination of motor output torque when the tachometer frequency is less than said first predetermined frequency.

8. The method of claim 7
with the second determination of output torque being in relation to a plurality of torque versus power lookup tables in accordance with the operation of the motor and each provided for a different predetermined motor speed, and with the output torque being established in relation to at least one lookup table selected in accordance with the input DC power and the motor speed.

* * * * *